US012811193B2

(12) United States Patent
Hersam et al.

(10) Patent No.: US 12,811,193 B2
(45) Date of Patent: Nov. 24, 2026

(54) HETEROSTRUCTURE IONOGEL ELECTROLYTES, FABRICATING METHODS AND APPLICATIONS OF SAME

(71) Applicant: NORTHWESTERN UNIVERSITY, Evanston, IL (US)

(72) Inventors: Mark C. Hersam, Wilmette, IL (US); Woo Jin Hyun, Evanston, IL (US)

(73) Assignee: NORTHWESTERN UNIVERSITY, Evanston, IL (US)

( * ) Notice: Subject to any disclaimer, the term of this patent is extended or adjusted under 35 U.S.C. 154(b) by 784 days.

(21) Appl. No.: 18/246,197

(22) PCT Filed: Sep. 28, 2021

(86) PCT No.: PCT/US2021/052307
§ 371 (c)(1),
(2) Date: Mar. 22, 2023

(87) PCT Pub. No.: WO2022/072313
PCT Pub. Date: Apr. 7, 2022

(65) Prior Publication Data

US 2023/0352729 A1 Nov. 2, 2023

Related U.S. Application Data

(60) Provisional application No. 63/085,240, filed on Sep. 30, 2020.

(51) Int. Cl.
*H01M 10/0564* (2010.01)
*H01M 10/0525* (2010.01)

(52) U.S. Cl.
CPC ... *H01M 10/0564* (2013.01); *H01M 10/0525* (2013.01); *H01M 2300/0085* (2013.01)

(58) Field of Classification Search
CPC ......... H01M 10/0564; H01M 10/0525; H01M 2300/0085; H01M 2300/0025; Y02E 60/10
See application file for complete search history.

(56) References Cited

U.S. PATENT DOCUMENTS

2019/0097273 A1 3/2019 Maschmeyer et al.

FOREIGN PATENT DOCUMENTS

KR 10-2018-0084681 A 7/2018

OTHER PUBLICATIONS

Korean Intellectual Property Office (ISR/KR), "International Search Report for PCT/US2021/052307", Korea, Jan. 19, 2022.
Hyun, Woo Jin et al., 'High-Modulus Hexagonal Boron Nitride Nanoplatelet Gel Electrolytes for Solid-State Rechargeable Lithium-Ion Batteries', ACS Nano, 2019, vol. 13, pp. 9664-9672.
(Continued)

*Primary Examiner* — Aiqun Li
(74) *Attorney, Agent, or Firm* — troutman pepper locke; Tim Tingkang Xia, Esq.

(57) ABSTRACT

A heterostructure ionogel electrolyte includes a first electrolyte comprising a first ionic liquid and a matrix; and a second electrolyte comprising a second ionic liquid and the matrix, wherein the first ionic liquid is a high-potential ionic liquid, the second ionic liquid is a low-potential ionic liquid, and the matrix comprises nanoplatelets/nanosheets; and wherein the first electrolyte and the second electrolyte are assembled to define a heterointerface therebetween.

11 Claims, 17 Drawing Sheets

(56) References Cited

OTHER PUBLICATIONS

Lu, Chao et al., 'In situ synthesized PEO/NBR composite ionogels for high-performance all-solid-state supercapacitors', Chem. Commun, 2019, vol. 55, pp. 8470-8473.
Maurya, Dheeraj Kumar et al., 'All-Solid-State Electrospun Poly(vinylidene fluoride-cohexafluoropropylene)/Li7.1La3Ba0.05Zr1.95O12 Nanohybrid Membrane Electrolyte for High-Energy Li-Ion Capacitors', The Journal of Physical Chemistry, 2019, vol. 123, pp. 30145-30154.
Hyun, Woo Jin et al., 'Layered Heterostructure lonogel Electrolytes for HighPerformance Solid-State Lithium-Ion Batteries', Advanced Materials, Feb. 17, 2021, vol. 33, 2007864, pp. 1-8.
R. Schmuch, R. Wagner, G. Hörpel, T. Placke, M. Winter, Performance and cost of materials for lithium-based rechargeable automotive batteries. Nat. Energy 3, 267-278 (2018).
M. Li, J. Lu, Z. Chen, K. Amine, 30 years of lithium-ion batteries. Adv. Mater. 30, 1800561 (2018).
A. Manthiram, X. Yu, S. Wang, Lithium battery chemistries enabled by solid-state electrolytes. Nat. Rev. Mater. 2, 16103 (2017).
D. H. Tan, A. Banerjee, Z. Chen, Y. S. Meng, From nanoscale interface characterization to sustainable energy storage using all-solid-state batteries. Nat. Nanotechnol. 15, 170-180 (2020).
J. Le Bideau, L. Viau, A. Vioux, lonogels, ionic liquid based hybrid materials. Chem. Soc. Rev. 40, 907-925 (2011).
N. Chen, H. Zhang, L. Li, R. Chen, S. Guo, lonogel electrolytes for high-performance lithium batteries: a review. Adv. Energy Mater. 8, 1702675 (2018).
M.- T. F. Rodrigues et al., A materials perspective on Li-ion batteries at extreme temperatures. Nat. Energy 2, 17108 (2017).
S. S. Moganty, N. Jayaprakash, J. L. Nugent, J. Shen, L. A. Archer, lonic-liquid-tethered nanoparticles: hybrid electrolytes. Angew. Chem. 122, 9344-9347 (2010).
K. Chen et al., Silica gel solid nanocomposite electrolytes with interfacial conductivity promotion exceeding the bulk Li-ion conductivity of the ionic liquid electrolyte filler. Sci. Adv. 6, eaav3400 (2020).
Z. Wang et al., A metal-organic-framework-based electrolyte with nanowetted interfaces for high-energy-density solid-state lithium battery. Adv. Mater. 30, 1704436 (2018).
D. S. Ashby, R. H. DeBlock, C.-H. Lai, C. S. Choi, B. S. Dunn, Patternable, solution-processed ionogels for thin-film lithium-ion electrolytes. Joule 1, 344-358 (2017).
G. Tan et al., Solid-state Li-ion batteries using fast, stable, glassy nanocomposite electrolytes for good safety and long cycle-life. Nano Lett. 16, 1960-1968 (2016).
A. Eftekhari, Y. Liu, P. Chen, Different roles of ionic liquids in lithium batteries. J. Power Sources 334, 221-239 (2016).
A. Lewandowski, A. Świderska-Mocek, lonic liquids as electrolytes for Li-ion batteries—An overview of electrochemical studies. J. Power Sources 194, 601-609 (2009).
B. Garcia, S. Lavallee, G. Perron, C. Michot, M. Armand, Room temperature molten salts as lithium battery electrolyte. Electrochim. Acta 49, 4583-4588 (2004).
A. Swiderska-Mocek, Electrolyte based on 1-ethyl-3-vinylimidazolium bis(trifluoromethanesulphonyl)imide for Li-ion batteries. Electrochim. Acta 132, 504-511 (2014).
K. Cao et al., High voltage LiNi0.5Mn1.5O4/Li4Ti5O12 lithium ion cells at elevated temperatures: carbonate-versus ionic liquid-based electrolytes. ACS Appl. Mater. Interfaces 8, 25971-25978 (2016).
M. Moreno et al., Ionic liquid electrolytes for safer lithium batteries. J. Electrochem. Soc. 164, A6026-A6031 (2017).
M. Egashira, H. Todo, N. Yoshimoto, M. Morita, J.-I. Yamaki, Functionalized imidazolium ionic liquids as electrolyte components of lithium batteries. J. Power Sources 174, 560-564 (2007).
M. Kerner, N. Plylahan, J. Scheers, P. Johansson, Ionic liquid based lithium battery electrolytes: fundamental benefits of utilising both TFSI and FSI anions?. Phys. Chem. Chem. Phys. 17, 19569-19581 (2015).
H. Srour, H. Rouault, C. Santini, Imidazolium based ionic liquid electrolytes for Li-ion secondary batteries based on graphite and LiFePO4. J. Electrochem. Soc. 160, A66-A69 (2013).
T. Sato, T. Maruo, S. Marukane, K. Takagi, lonic liquids containing carbonate solvent as electrolytes for lithium ion cells. J. Power Sources 138, 253-261 (2004).
E. Simonetti et al., Towards Li(Ni0. 33Mn0. 33Co0. 33)O2/graphite batteries with ionic liquid-based electrolytes. I. Electrodes' behavior in lithium half-cells. J. Power Sources 331, 426-434 (2016).
H. Matsumoto, H. Sakaebe, K. Tatsumi, Preparation of room temperature ionic liquids based on aliphatic onium cations and asymmetric amide anions and their electrochemical properties as a lithium battery electrolyte. J. Power Sources 146, 45-50 (2005).
M. Ishikawa, T. Sugimoto, M. Kikuta, E. Ishiko, M. Kono, Pure ionic liquid electrolytes compatible with a graphitized carbon negative electrode in rechargeable lithium-ion batteries. J. Power Sources 162, 658-662 (2006).
D. M. Piper et al., Stable silicon-ionic liquid interface for next-generation lithium-ion batteries. Nat. Commun. 6, 6230 (2015).
W. J. Hyun et al., High-modulus hexagonal boron nitride nanoplatelet gel electrolytes for solid-state rechargeable lithium-ion batteries. ACS nano 13, 9664-9672 (2019).
G. B. Appetecchi et al., Lithium insertion in graphite from ternary ionic liquid-lithium salt electrolytes: I. Electrochemical characterization of the electrolytes. J. Power Sources 192, 599-605 (2009).
M. Yamagata et al., Charge-discharge behavior of graphite negative electrodes in bis(fluorosulfonyl)imide-based ionic liquid and structural aspects of their electrode/electrolyte interfaces. Electrochim. Acta 110, 181-190 (2013).
W. Li, J. N. Reimers, J. R. Dahn, In situ x-ray diffraction and electrochemical studies of Li1—xNiO2. Solid State Ion. 67, 123-130 (1993).
H.-J. Noh, S. Youn, C. S. Yoon, Y.-K. Sun, Comparison of the structural and electrochemical properties of layered Li [NixCoyMnz]O2 (x = 1/3, 0.5, 0.6, 0.7, 0.8 and 0.85) cathode material for lithium-ion batteries. J. Power Sources 233, 121-130 (2013).
Y. J. Nam, D. Y. Oh, S. H. Jung, Y. S. Jung, Toward practical all-solid-state lithium-ion batteries with high energy density and safety: comparative study for electrodes fabricated by dry-and slurry-mixing processes. J. Power Sources 375, 93-101 (2018).
A. Sakuda et al., All-solid-state battery electrode sheets prepared by a slurry coating process. J. Electrochem. Soc. 164, A2474-A2478 (2017).
M. Yamamoto, Y. Terauchi, A. Sakuda, M. Takahashi, Binder-free sheet-type all-solid-state batteries with enhanced fate capabilities and high energy densities. Sci. Rep. 8, 1212 (2018).
Y. Kato et al., High-power all-solid-state batteries using sulfide superionic conductors. Nat. Energy 1, 16030 (2016).
D. H. Kim et al., Infiltration of solution-processable solid electrolytes into conventional Li-ion-battery electrodes for all-solid-state Li-ion batteries. Nano Lett. 17, 3013-3020 (2017).
M. A. Kraft et al., Inducing high ionic conductivity in the lithium superionic argyrodites Li6+xP1-xGexS5I for all-solid-state batteries. J. Am. Chem. Soc. 140, 16330-16339 (2018).
W. J. Hyun, C. M. Thomas, M. C. Hersam, Nanocomposite ionogel electrolytes for solid-state rechargeable batteries. Adv. Energy Mater. 10, 2002135 (2020).
P. Zhang et al., Polymerized ionic networks with high charge density: quasi-solid electrolytes in lithium-metal batteries. Adv. Mater. 27, 8088-8094 (2015).
G. Zheng et al., Interconnected hollow carbon nanospheres for stable lithium metal anodes. Nat. Nanotechnol. 9, 618-623 (2014).
S. Choudhury, R. Mangal, A. Agrawal, L. A. Archer, A highly reversible room-temperature lithium metal battery based on cross-linked hairy nanoparticles. Nat. Commun. 6, 10101 (2015).

HETEROSTRUCTURE IONOGEL ELECTROLYTES, FABRICATING METHODS AND APPLICATIONS OF SAME

CROSS-REFERENCE TO RELATED PATENT APPLICATION

This application claims priority to and the benefit of U.S. Provisional Application No. 63/085,240, filed Sep. 30, 2020, which is incorporated herein in its entirety by reference.

STATEMENT AS TO RIGHTS UNDER FEDERALLY-SPONSORED RESEARCH

This invention was made with government support under DMR1720139 awarded by the National Science Foundation and DE-AC02-06CH11357 awarded by the Department of Energy. The government has certain rights in the invention.

FIELD OF THE INVENTION

The present invention relates generally to energy storage, and more particularly to layered heterostructure ionogel electrolytes, fabricating methods and applications of the same.

BACKGROUND OF THE INVENTION

The background description provided herein is for the purpose of generally presenting the context of the invention. The subject matter discussed in the background of the invention section should not be assumed to be prior art merely as a result of its mention in the background of the invention section. Similarly, a problem mentioned in the background of the invention section or associated with the subject matter of the background of the invention section should not be assumed to have been previously recognized in the prior art. The subject matter in the background of the invention section merely represents different approaches, which in and of themselves may also be inventions. Work of the presently named inventors, to the extent it is described in the background of the invention section, as well as aspects of the description that may not otherwise qualify as prior art at the time of filing, are neither expressly nor impliedly admitted as prior art against the invention.

Lithium-ion batteries are the leading energy storage technology for the growing markets of portable electronics, electric vehicles, and grid-level management systems. To satisfy the increasing demand for higher energy densities, substantial effort has been devoted to elevating the operating voltage of lithium-ion batteries. Although a number of high-potential cathode materials have been developed in this context, their practical deployment has been hindered by insufficient high-potential stability of conventional liquid electrolytes based on carbonate solvents and lithium salts. Moreover, the high flammability of organic solvents poses serious safety concerns when liquid electrolytes are subjected to voltage conditions exceeding their electrochemical stability limits, which presents a further barrier to increasing energy density in conventional lithium-ion battery designs. To overcome these issues, significant attention has been directed toward the development of solid-state electrolytes as a replacement to liquid electrolytes in lithium-ion batteries. Although considerable progress has been achieved, solid-state electrolytes based on inorganics and polymers continue to face important challenges in practical applications, including low ionic conductivity, high interfacial resistance, and cumbersome processing.

Ionogels are solid-state electrolytes based on ionic liquids and gelling matrices, which have attracted considerable attention for lithium-ion batteries. In contrast to traditional liquid electrolytes, ionic liquids offer nonflammability, negligible vapor pressure, and high thermal stability, which not only addresses safety concerns but also elevates the high-temperature limit of battery operation. Moreover, ionogel electrolytes provide high ionic conductivity, favorable interfacial contact with electrodes, and wide processing compatibility, which address the key issues confronting inorganic and polymer solid-state electrolytes. The electrochemical stability windows of ionogel electrolytes primarily depend on the ionic liquids. Since the anodic and cathodic stability of ionic liquids can be manipulated by altering the constituent anions and cations, a wide range of ionic liquids with different electrochemical windows have been explored for lithium-ion batteries. However, despite extensive research into ionic liquid electrolytes, no single ionic liquid has simultaneously achieved desirable high-potential and low-potential stability. Consequently, full-cell lithium-ion batteries based on ionic liquids have typically been demonstrated using electrodes with modest potentials, thereby restricting operating voltage and energy density. While mixed ionic liquids have been proposed for synergetic effects, this approach has not fully widened the operating voltage of full-cell lithium-ion batteries. Alternatively, organic carbonates have been added to ionic liquid electrolytes to enhance cathodic stability, but at the cost of compromising safety.

Therefore, a heretofore unaddressed need exists in the art to address the aforementioned deficiencies and inadequacies.

SUMMARY OF THE INVENTION

One of the objectives of this invention is to provide layered heterostructure ionogel electrolytes combining high-potential (anodic stability: greater than 5 V vs $Li/Li^+$) and low-potential (cathodic stability: less than 0 V vs $Li/Li^+$) ionic liquids in a hexagonal boron nitride nanoplatelet matrix. These layered heterostructure ionogel electrolytes lead to extended electrochemical windows, while preserving high ionic conductivity (greater than 1 mS $cm^{-1}$ at room temperature), thereby enabling advances in the energy density and rate capability of solid-state batteries.

In one aspect of the invention, the heterostructure ionogel electrolyte comprises a first electrolyte comprising a first ionic liquid and a matrix; and a second electrolyte comprising a second ionic liquid and the matrix. The first electrolyte and the second electrolyte are assembled to define an heterointerface therebetween. The first ionic liquid is a high-potential ionic liquid. The second ionic liquid is a low-potential ionic liquid. The matrix comprises nanoplatelets/nanosheets.

In one embodiment, the first electrolyte is configured to serve as a high-potential electrolyte on a side of a cathode electrode of an electrochemical device such as a battery, and the second electrolyte is configured to serve as a low-potential electrolyte on a side of an anode electrode of the electrochemical device.

In one embodiment, each of the first and second electrolytes is configured to provide a different electrochemical window to allow stability against both the cathode electrode and the anode electrode, with the nanoplatelets/nanosheets providing the large surface area to immobilize the first and second ionic liquids, thereby minimizing intermixing at the heterointerface.

In one embodiment, the heterostructure ionogel electrolyte is configured to have an extended electrochemical window that fully covers potentials of the cathode electrode and the anode electrode of the electrochemical device.

In one embodiment, the first ionic liquid has anodic stability with potential being greater than 5 V vs $Li/Li^+$, and the second ionic liquid has cathodic stability with potential being less than 0 V vs $Li/Li^+$.

In one embodiment, the low-potential and high-potential ionic liquids have low viscosity and high ionic conductivity.

In one embodiment, the low-potential ionic liquid is configured such that anions enable cathodic stability, and the high-potential ionic liquid is configured to have oxidative stability of anions.

In one embodiment, the first ionic liquid and the second ionic liquid are prepared with ionic liquids including ammonium, imidazolium, pyrrolidinium, pyridinium, piperidinium, phosphonium, or sulfonium-based ionic liquids.

In one embodiment, each of the first and second ionic liquids further comprises an lithium salt, a sodium salt, a potassium salt, a magnesium salt, a calcium salt, a zinc salt, or an aluminum salts.

In one embodiment, the lithium salt comprises lithium bis(fluorosulfonyl)imide, lithium hexafluorophosphate, lithium tetrafluoroborate, lithium perchlorate, lithium trifluoromethanesulfonate, lithium fluoroalkylsufonimides, lithium fluoroarylsufonimides, lithium bis(oxalate borate), lithium tris(trifluoromethylsulfonylimide)methide, lithium tetrachloroaluminate, or lithium chloride.

In one embodiment, the first ionic liquid comprises a 1-ethyl-3-methylimidazolium bis(trifluoromethylsulfonyl) imide (EMIM-TFSI) ionic liquid, and the second ionic liquid comprises a 1-ethyl-3-methylimidazolium bis(fluorosulfonyl)imide (EMIM-FSI) ionic liquid.

In one embodiment, each of the first and second ionic liquids further comprises lithium bis(trifluoromethylsulfonyl)imide (LiTFSI) salt.

In one embodiment, the matrix comprises hexagonal boron nitride (hBN) nanoplatelets/nanosheets.

In one embodiment, the hBN nanoplatelets/nanosheets are liquid-phase exfoliated hBN nanoplatelets/nanosheets formed from bulk hBN microparticles by a liquid-phase exfoliation method.

In one embodiment, a ratio between each of the first and second ionic liquids and the nanoplatelets/nanosheets is about 3:2 by weight.

In another aspect, the invention relates to an electrochemical device comprising the heterostructure ionogel electrolyte disclosed above.

In one embodiment, the electrochemical device further comprises an anode electrode and a cathode electrode arranged such that the first electrolyte adjoins the cathode electrode and the second electrolyte adjoins the anode electrode.

In one embodiment, the electrochemical device is a lithium (Li) battery, a sodium battery, a potassium, a magnesium battery, a calcium battery, a zinc battery, or an aluminum battery.

In one embodiment, the first ionic liquid has anodic stability with potential being greater than 5 V vs $Li/Li^+$, and the second ionic liquid has cathodic stability with potential being less than 0 V vs $Li/Li^+$.

In one embodiment, the cathode electrode comprises lithium nickel manganese cobalt oxides, lithium iron phosphate, lithium cobalt oxide, lithium nickel cobalt aluminum oxides, lithium manganese oxide, lithium nickel manganese oxide, lithium nickel oxide, or other electrochemically active materials.

In one embodiment, the anode electrode comprises graphite, lithium titanate, $Li_2TiSiO_5$, silicon, germanium, tin, lithium metal, or other electrochemically active materials.

In one embodiment, specific energy of the electrochemical device at 1 C is at least two times greater than that of solid-state lithium-ion batteries at the same rate.

In another aspect, the invention relates to a method of producing a heterostructure ionogel electrolyte for extending electrochemical windows while preserving high ionic conductivity. The method comprises providing a first ionic liquid, a second ionic liquid, and a matrix, wherein the first ionic liquid is a high-potential ionic liquid, the second ionic liquid is a low-potential ionic liquid, and the matrix comprises nanoplatelets/nanosheets; mixing the first ionic liquid with the matrix to form a first electrolyte, and mixing the second ionic liquid with the matrix to form a second electrolyte; and assembling the first electrolyte and the second electrolyte to define an heterointerface therebetween.

In one embodiment, the low-potential and high-potential ionic liquids have low viscosity and high ionic conductivity.

In one embodiment, the low-potential ionic liquid is configured such that anions enable cathodic stability, and the high-potential ionic liquid is configured to have oxidative stability of anions.

In one embodiment, the first ionic liquid and the second ionic liquid are prepared with ionic liquids including ammonium, imidazolium, pyrrolidinium, pyridinium, piperidinium, phosphonium, or sulfonium-based ionic liquids.

In one embodiment, each of the first and second ionic liquids further comprises an lithium salt, a sodium salt, a potassium salt, a magnesium salt, a calcium salt, a zinc salt, or an aluminum salts.

In one embodiment, the lithium salt comprises lithium bis(fluorosulfonyl)imide, lithium hexafluorophosphate, lithium tetrafluoroborate, lithium perchlorate, lithium trifluoromethanesulfonate, lithium fluoroalkylsufonimides, lithium fluoroarylsufonimides, lithium bis(oxalate borate), lithium tris(trifluoromethylsulfonylimide)methide, lithium tetrachloroaluminate, or lithium chloride.

In one embodiment, the first ionic liquid comprises an EMIM-TFSI ionic liquid, and the second ionic liquid comprises an EMIM-FSI ionic liquid.

In one embodiment, each of the first and second ionic liquids further comprises LiTFSI salt.

In one embodiment, the matrix comprises hBN nanoplatelets/nanosheets.

In one embodiment, the hBN nanoplatelets/nanosheets are liquid-phase exfoliated hBN nanoplatelets/nanosheets formed from bulk hBN microparticles by a liquid-phase exfoliation method.

In one embodiment, a ratio between each of the first and second ionic liquids and the nanoplatelets/nanosheets is 3:2 by weight.

These and other aspects of the present invention will become apparent from the following description of the preferred embodiment taken in conjunction with the following drawings, although variations and modifications therein may be affected without departing from the spirit and scope of the novel concepts of the invention.

BRIEF DESCRIPTION OF THE DRAWINGS

The accompanying drawings illustrate one or more embodiments of the invention and together with the written description, serve to explain the principles of the invention. Wherever possible, the same reference numbers are used throughout the drawings to refer to the same or like elements of an embodiment.

DETAILED DESCRIPTION OF THE INVENTION

Figure 1:
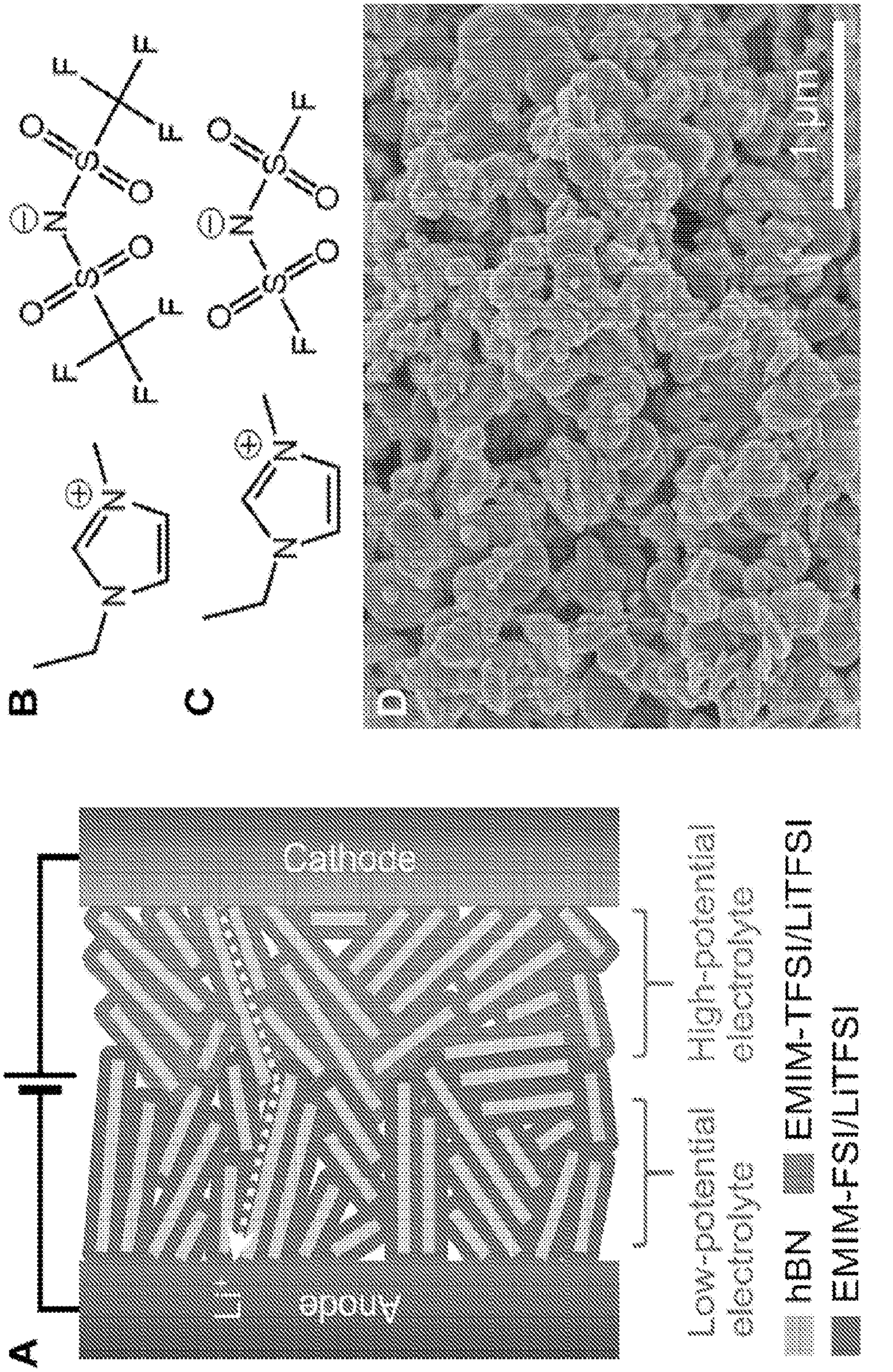
FIG. 1 shows layered heterostructure ionogel electrolyte for solid-state lithium-ion batteries, according to embodiments of the invention. Panel A: Schematic of a solid-state lithium-ion battery using the layered heterostructure ionogel electrolyte with two different ionic liquids and hexagonal boron nitride (hBN) nanoplatelets. EMIM-TFSI, EMIM-FSI, and LiTFSI denote 1-ethyl-3-methylimidazolium bis(trifluoromethylsulfonyl)imide, 1-ethyl-3-methylimidazolium bis(fluorosulfonyl)imide, and lithium bis(trifluoromethylsulfonyl)imide, respectively. In the layered heterostructure ionogel electrolyte, the ionogels based on EMIM-FSI/LiTFSI and EMIM-TFSI/LiTFSI serve as low-potential and high-potential electrolytes, respectively. Panels B-C: Chemical structures of EMIM-TFSI and EMIM-FSI ionic liquids, respectively. Panel D: Scanning electron microscopy image of the hBN nanoplatelets employed as the solid matrix for the formulation of the ionogel electrolytes.

The invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this specification will be thorough and complete, and will fully convey the scope of the invention to those skilled in the art. Like reference numerals refer to like elements throughout.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention. For convenience, certain terms may be highlighted, for example using italics and/or quotation marks. The use of highlighting has no influence on the scope and meaning of a term; the scope and meaning of a term are the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the invention or of any exemplified term. Likewise, the invention is not limited to various embodiments given in this specification.

It will be understood that, as used in the description herein and throughout the claims that follow, the meaning of "a", "an", and "the" includes plural reference unless the context clearly dictates otherwise. Also, it will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the invention.

Furthermore, relative terms, such as "lower" or "bottom" and "upper" or "top," may be used herein to describe one element's relationship to another element as illustrated in the figures. It will be understood that relative terms are intended to encompass different orientations of the device in addition to the orientation depicted in the figures. For example, if the device in one of the figures. is turned over, elements described as being on the "lower" side of other elements would then be oriented on "upper" sides of the other elements. The exemplary term "lower", can, therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

It will be further understood that the terms “comprises” and/or “comprising,” or “includes” and/or “including” or “has” and/or “having”, or “carry” and/or “carrying,” or “contain” and/or “containing,” or “involve” and/or “involving, and the like are to be open-ended, i.e., to mean including but not limited to. When used in this specification, they specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and this specification, and will not be interpreted in an idealized or overly formal sense unless expressly so defined herein.

As used in this specification, “around”, “about”, “approximately” or “substantially” shall generally mean within 20 percent, preferably within 10 percent, and more preferably within 5 percent of a given value or range. Numerical quantities given herein are approximate, meaning that the term “around”, “about”, “approximately” or “substantially” can be inferred if not expressly stated.

As used in this specification, the phrase “at least one of A, B, and C” should be construed to mean a logical (A or B or C), using a non-exclusive logical OR. As used herein, the term “and/or” includes any and all combinations of one or more of the associated listed items.

The description below is merely illustrative in nature and is in no way intended to limit the invention, its application, or uses. The broad teachings of the invention can be implemented in a variety of forms. Therefore, while this invention includes particular examples, the true scope of the invention should not be so limited since other modifications will become apparent upon a study of the drawings, the specification, and the following claims. For purposes of clarity, the same reference numbers will be used in the drawings to identify similar elements. It should be understood that one or more steps within a method may be executed in a different order (or concurrently) without altering the principles of the invention.

Ionogel electrolytes based on ionic liquids and gelling matrices offer several advantages for solid-state lithium-ion batteries, including nonflammability, wide processing compatibility, and favorable electrochemical and thermal properties. However, the absence of ionic liquids that are concurrently stable at low and high potentials constrains the electrochemical windows of ionogel electrolytes and thus their high-energy-density applications.

One of the objectives of this invention is to develop layered heterostructure ionogel electrolytes combining high-potential (anodic stability: greater than 5 V vs $Li/Li^+$) and low-potential (cathodic stability: less than 0 V vs $Li/Li^+$) ionic liquids in a hexagonal boron nitride nanoplatelet matrix. These layered heterostructure ionogel electrolytes lead to extended electrochemical windows, while preserving high ionic conductivity (greater than 1 mS $cm^{-1}$ at room temperature), thereby enabling advances in the energy density and rate capability of solid-state lithium-ion batteries.

In one aspect of the invention, the heterostructure ionogel electrolyte comprises a first ionic liquid, a second ionic liquid, and a matrix. The first ionic liquid is a high-potential ionic liquid. The second ionic liquid is a low-potential ionic liquid. The matrix comprises nanoplatelets/nanosheets. The first ionic liquid is mixed with the matrix to form a first electrolyte, and the second ionic liquid is mixed with the matrix to form a second electrolyte. The first electrolyte and the second electrolyte are assembled to define an heterointerface therebetween.

In some embodiments, the first electrolyte is configured to serve as a high-potential electrolyte on a side of a cathode electrode of an electrochemical device such as a battery, and the second electrolyte is configured to serve as a low-potential electrolyte on a side of an anode electrode of the electrochemical device.

In some embodiments, each of the first and second electrolytes is configured to provide a different electrochemical window to allow stability against both the cathode electrode and the anode electrode, with the nanoplatelets/nanosheets providing the large surface area to immobilize the first and second ionic liquids, thereby minimizing intermixing at the heterointerface.

In some embodiments, the heterostructure ionogel electrolyte is configured to have an extended electrochemical window that fully covers potentials of the cathode electrode and the anode electrode of the electrochemical device.

In some embodiments, the first ionic liquid has anodic stability with potential being greater than 5 V vs $Li/Li^+$, and the second ionic liquid has cathodic stability with potential being less than 0 V vs $Li/Li^+$.

In some embodiments, the low-potential and high-potential ionic liquids have low viscosity and high ionic conductivity.

In some embodiments, the low-potential ionic liquid is configured such that anions enable cathodic stability, and the high-potential ionic liquid is configured to have oxidative stability of anions.

In some embodiments, the first ionic liquid and the second ionic liquid are prepared with ionic liquids including ammonium, imidazolium, pyrrolidinium, pyridinium, piperidinium, phosphonium, or sulfonium-based ionic liquids.

In some embodiments, each of the first and second ionic liquids further comprises an lithium salt, a sodium salt, a potassium salt, a magnesium salt, a calcium salt, a zinc salt, or an aluminum salts.

In some embodiments, the lithium salt comprises lithium bis(fluorosulfonyl)imide, lithium hexafluorophosphate, lithium tetrafluoroborate, lithium perchlorate, lithium trifluoromethanesulfonate, lithium fluoroalkylsufonimides, lithium fluoroarylsufonimides, lithium bis(oxalate borate), lithium tris(trifluoromethylsulfonylimide)methide, lithium tetrachloroaluminate, or lithium chloride.

In some embodiments, the first ionic liquid comprises a 1-ethyl-3-methylimidazolium bis(trifluoromethylsulfonyl)imide (EMIM-TFSI) ionic liquid, and the second ionic liquid comprises a 1-ethyl-3-methylimidazolium bis(fluorosulfonyl)imide (EMIM-FSI) ionic liquid.

In some embodiments, each of the first and second ionic liquids further comprises lithium bis(trifluoromethylsulfonyl)imide (LiTFSI) salt.

In some embodiments, the matrix comprises hexagonal boron nitride (hBN) nanoplatelets/nanosheets.

In some embodiments, the hBN nanoplatelets/nanosheets are liquid-phase exfoliated hBN nanoplatelets/nanosheets formed from bulk hBN microparticles by a liquid-phase exfoliation method.

In some embodiments, a ratio between each of the first and second ionic liquids and the nanoplatelets/nanosheets is about 3:2 by weight.

In another aspect, the invention relates to an electrochemical device comprising the heterostructure ionogel electrolyte disclosed above.

In some embodiments, the electrochemical device further comprises an anode electrode and a cathode electrode arranged such that the first electrolyte adjoins the cathode electrode and the second electrolyte adjoins the anode electrode.

In some embodiments, the electrochemical device is a lithium (Li) battery, a sodium battery, a potassium, a magnesium battery, a calcium battery, a zinc battery, or an aluminum battery.

In some embodiments, the first ionic liquid has anodic stability with potential being greater than 5 V vs $Li/Li^+$, and the second ionic liquid has cathodic stability with potential being less than 0 V vs $Li/Li^+$.

In some embodiments, the cathode electrode comprises lithium nickel manganese cobalt oxides, lithium iron phosphate, lithium cobalt oxide, lithium nickel cobalt aluminum oxides, lithium manganese oxide, lithium nickel manganese oxide, lithium nickel oxide, or other electrochemically active materials.

In some embodiments, the anode electrode comprises graphite, lithium titanate, $Li_2TiSiO_5$, silicon, germanium, tin, lithium metal, or other electrochemically active materials.

In some embodiments, specific energy of the electrochemical device at 1 C is at least two times greater than that of solid-state lithium-ion batteries at the same rate.

In another aspect, the invention relates to a method of producing a heterostructure ionogel electrolyte for extending electrochemical windows while preserving high ionic conductivity. The method comprises providing a first ionic liquid, a second ionic liquid, and a matrix, wherein the first ionic liquid is a high-potential ionic liquid, the second ionic liquid is a low-potential ionic liquid, and the matrix comprises nanoplatelets/nanosheets; mixing the first ionic liquid with the matrix to form a first electrolyte, and mixing the second ionic liquid with the matrix to form a second electrolyte; and assembling the first electrolyte and the second electrolyte to define an heterointerface therebetween.

In some embodiments, the low-potential and high-potential ionic liquids have low viscosity and high ionic conductivity.

In some embodiments, the low-potential ionic liquid is configured such that anions enable cathodic stability, and the high-potential ionic liquid is configured to have oxidative stability of anions.

In some embodiments, the first ionic liquid and the second ionic liquid are prepared with ionic liquids including ammonium, imidazolium, pyrrolidinium, pyridinium, piperidinium, phosphonium, or sulfonium-based ionic liquids.

In some embodiments, each of the first and second ionic liquids further comprises an lithium salt, a sodium salt, a potassium salt, a magnesium salt, a calcium salt, a zinc salt, or an aluminum salts.

In some embodiments, the lithium salt comprises lithium bis(fluorosulfonyl)imide, lithium hexafluorophosphate, lithium tetrafluoroborate, lithium perchlorate, lithium trifluoromethanesulfonate, lithium fluoroalkylsufonimides, lithium fluoroarylsufonimides, lithium bis(oxalate borate), lithium tris(trifluoromethylsulfonylimide)methide, lithium tetrachloroaluminate, or lithium chloride.

In some embodiments, the first ionic liquid comprises an EMIM-TFSI ionic liquid, and the second ionic liquid comprises an EMIM-FSI ionic liquid.

In some embodiments, each of the first and second ionic liquids further comprises LiTFSI salt.

In some embodiments, the matrix comprises hBN nanoplatelets/nanosheets.

In some embodiments, the hBN nanoplatelets/nanosheets are liquid-phase exfoliated hBN nanoplatelets/nanosheets formed from bulk hBN microparticles by a liquid-phase exfoliation method.

In some embodiments, a ratio between each of the first and second ionic liquids and the nanoplatelets/nanosheets is about 3:2 by weight.

The invention may have applications in a variety of fields, such as solid-state batteries, lithium-ion batteries, supercapacitors, transistors, neuromorphic computing devices, flexible electronics, printed electronics, and so on.

Among other things, the invention has at least the following advantages over the existing art.

To satisfy the increasing demand for higher energy densities, substantial effort has been devoted to elevating the operating voltage of lithium-ion batteries. Although a number of high-potential cathode materials have been developed in this context, their practical deployment has been hindered by insufficient high-potential stability of conventional liquid electrolytes based on carbonate solvents and lithium salts. Moreover, the high flammability of organic solvents poses serious safety concerns when liquid electrolytes are subjected to voltage conditions exceeding their electrochemical stability limits, which presents a further barrier to increasing energy density in conventional lithium-ion battery designs. To overcome these issues, significant attention has been directed toward the development of solid-state electrolytes as a replacement to liquid electrolytes in lithium-ion batteries. Although considerable progress has been achieved, solid-state electrolytes based on inorganics and polymers continue to face important challenges in practical applications, including low ionic conductivity, high interfacial resistance, and cumbersome processing.

Ionogels are solid-state electrolytes based on ionic liquids and gelling matrices. In contrast to traditional liquid electrolytes, ionic liquids offer nonflammability, negligible vapor pressure, and high thermal stability, which not only addresses safety concerns but also elevates the high-temperature limit of battery operation. Moreover, ionogel electrolytes provide high ionic conductivity, favorable interfacial contact with electrodes, and wide processing compatibility, which address the key issues confronting inorganic and polymer solid-state electrolytes.

The electrochemical stability windows of ionogel electrolytes primarily depend on the ionic liquids. However, no single ionic liquid has simultaneously achieved desirable high-potential and low-potential stability. Layered heterostructure ionogel electrolytes based on two different ionic liquids and hBN nanoplatelets achieve wide electrochemical stability for solid-state lithium-ion batteries. In this approach, each ionogel electrolyte provides a different electrochemical window to allow stability against both the high-potential cathode and the low-potential anode, with the hBN nanoplatelets providing a large surface area to immobilize the ionic liquids and thus minimize intermixing at the heterointerface. The combined electrochemical windows enable the fabrication of full-cell solid-state lithium-ion batteries with voltages that are unachievable with the individual ionic liquids. Moreover, the layered heterostructure ionogel electrolytes preserve the high ionic conductivity of the constituent ionic liquids, leading to unprecedented rate performance for high-energy-density solid-state lithium-ion batteries.

These and other aspects of the invention are further described below. Without intent to limit the scope of the invention, exemplary instruments, apparatus, methods, and their related results according to the embodiments of the invention are given below. Note that titles or subtitles may be used in the examples for convenience of a reader, which in no way should limit the scope of the invention. Moreover, certain theories are proposed and disclosed herein; however, in no way they, whether they are right or wrong, should limit the scope of the invention so long as the invention is practiced according to the invention without regard for any particular theory or scheme of action.

EXAMPLE

Layered Heterostructure Ionogel Electrolytes for High-Performance Solid-State Lithium-Ion Batteries In this exemplary study, layered heterostructure ionogel electrolytes are disclosed, which are based on two imidazolium ionic liquids to broaden the electrochemical stability window and thus operating voltage and energy density of full-cell solid-state lithium-ion batteries. The key to realizing layered heterostructures is to increase ionogel mechanical properties in a manner that minimizes intermixing at the layered ionogel heterointerface through the use of hBN nanoplatelets as the gelling matrix. In the optimal design for full-cell solid-state lithium-ion batteries, one of the ionic liquids possesses high anodic stability and adjoins the cathode, while the ionic liquid on the other side of the ionogel heterointerface possesses high cathodic stability and contacts the anode. As such, the layered heterostructure ionogel electrolytes enable extended electrochemical windows and high operating voltages, while maintaining high ionic conductivity, which results in superlative energy densities and rate performance for solid-state lithium-ion batteries.

Materials and Methods

Exfoliation of hBN nanoplatelets: hBN nanoplatelets were prepared from bulk hBN microparticles by a liquid-phase exfoliation method. In a typical batch process, 120 g of bulk hBN microparticles (~1 μm, Sigma-Aldrich), and 12 g of ethyl cellulose (4 cP viscosity grade, Sigma-Aldrich) stabilizing polymer were added to 800 mL of ethanol. The solution was shear-mixed at 10,230 rpm for 2 h, using a rotor/stator mixer (L5M-A, Silverson) with a square hole screen. The shear-mixed solution was centrifuged (J26-XPI, Beckman Coulter) at 4,000 rpm for 20 min to sediment large particles. The supernatant was collected and mixed with an aqueous solution of 40 mg $mL^{-1}$ sodium chloride (16:9 by weight) to flocculate exfoliated hBN nanoplatelets and ethyl cellulose, followed by centrifugation at 7,500 rpm for 6 min. The sedimented hBN nanoplatelets and ethyl cellulose were washed with deionized water to eliminate residual sodium chloride, dried with an infrared lamp, and ground with a mortar and pestle to yield a powder. Finally, the powder was annealed at 400° C. for 4 h in air to decompose ethyl cellulose.

Formulation of ionogel electrolytes: 1 M LiTFSI (99.95% trace metal basis, Sigma-Aldrich) was dissolved in EMIM-TFSI ($H_2O \leq 500$ ppm, Sigma-Aldrich) and EMIM-FSI ($H_2O \leq 0.002\%$, Solvionic) by stirring with a magnetic stir bar on a hotplate at 60° C. for 24 h. Employing a mortar and pestle, the EMIM-TFSI/LiTFSI and EMIM-FSI/LiTFSI were mixed with the hBN nanoplatelets to formulate high-potential and low-potential ionogel electrolytes, respectively. To prepare the mixed ionogel electrolyte, the ionic liquids (50% EMIM-TFSI/LiTFSI and 50% EMIM-FSI/LiTFSI by weight) and hBN nanoplatelets were mixed using the mortar and pestle. The ratio between the ionic liquids and hBN nanoplatelets for all ionogel electrolytes was about 3:2 by weight.

Characterization: Exfoliated hBN nanoplatelets were observed using a scanning electron microscope (SU8030, Hitachi). The ionic conductivity (σ) of the ionogel electrolytes was measured with a stainless steel|electrolyte|stainless steel geometry and the following equation:

$$\sigma = \frac{t}{A \times R}$$

where t and A are the thickness and area, respectively, of the ionogel electrolyte between the stainless steel electrodes. In addition, R is the bulk resistance determined by electrochemical impedance spectroscopy using a potentiostat (VSP, BioLogic), with a frequency range of 1 MHz-100 mHz and an amplitude of 10 mV. The electrochemical windows of the high-potential and low-potential electrolytes were characterized with Li|electrolyte|stainless steel coin cells (CR2032-type) by cyclic and linear sweep voltammetry using the potentionstat at a scan rate of 1 mV $s^{-1}$. Different cells were used to investigate the anodic and cathode limits. Lithium plating-stripping tests were performed using Li|electrolyte|Cu coin cells (CR2032-type) after cycling the cells between 0 and 0.5 V (vs $Li/Li^{+}$) for 10 cycles. Viscoelastic properties of the ionogel electrolytes were characterized using a rheometer (MCR 302, Anton Paar) equipped with a 8 mm diameter parallel plate (gap between the rheometer stage and parallel plate: 1 mm) with a strain of 0.1% at 25° C. The viscosity of the ionic liquids was measured using the rheometer equipped with a 25 mm, 2° cone and plate geometry at 25° C.

Preparation of electrodes: To prepare NMC and graphite electrodes, active materials (NMC from Targray, graphite from Alfa Aesar), carbon black (MTI Corporation), and polyvinylidene fluoride (MTI Corporation or Kynar) in a weight ratio of 8:1:1 were mixed with 1-methyl-2-pyrrolidinone. The NMC and graphite slurries were cast onto aluminum and copper substrates, respectively, followed by drying in a vacuum oven at 80° C. for longer than 24 h. The electrodes were used after cutting into circles with a diameter of 1 cm. Active material loading was 2.1 and 0.9 mg $cm^{-2}$ for the NMC and graphite electrodes, respectively.

Battery assembly: CR2032-type coin cells were used for all battery testing. To enhance the interfacial contact between the ionogel electrolytes and electrodes, a small amount of ionic liquid was drop-cast onto the electrodes, and the excess on the electrode surfaces was removed with a Kimtech wipe. For half-cells, ionogel electrolytes were transferred and spread on lithium metal using a spatula, and NMC and graphite electrodes were placed on the ionogel electrolytes. NMC and graphite electrodes for full-cells were pretreated to minimize the irreversible capacity of initial cycles. For the pretreatment, half-cells were assembled with a glass microfiber filter (GF/C grade, Whatman) and the ionic liquid electrolyte (EMIM-TFSI/LiTFSI for NMC and EMIM-TFSI-FSI/LiTFSI for graphite), charged and discharged for one cycle at 0.05 C, and disassembled to recover the electrodes. For full-cells with the layered heterostructure ionogel electrolyte, the high-potential and low-potential ionogel electrolytes were applied to NMC and graphite electrodes, respectively, and the electrodes were sandwiched. For control cells, the mixed ionogel electrolyte was deposited onto NMC electrodes, and graphite electrodes were placed on the ionogel electrolyte. Rate capability and cycling tests of the full-cells were performed after one activation cycle at 0.5 C. The thickness of the layered heterostructure and mixed ionogel electrolytes was 60-80 μm, which was measured after disassembling the full-cells. Specific energy (E) of the full-cells was calculated using the following equation:

$$E = \frac{1}{m}\int_0^T i \times V dt$$

where T, V, i, and m are the discharge time, cell voltage, current, and mass of the cathode active material, respectively. All battery cells were prepared in an argon-filled glovebox and measured with a battery testing system (BT-2143, Arbin) at room temperature.

Ionogel Formulation

Panel A of FIG. 1 depicts a schematic of a lithium-ion battery using the layered heterostructure ionogel electrolyte based on two ionic liquids and hBN nanoplatelets. To fabricate the layered heterostructure electrolyte, one ionogel was prepared with a 1-ethyl-3-methylimidazolium bis(trifluoromethylsulfonyl)imide (EMIM-TFSI, Panel B of FIG. 1) ionic liquid containing 1 M lithium bis(trifluoromethylsulfonyl)imide (LiTFSI) salt, which serves as a high-potential electrolyte on the cathode side of the battery. The other ionogel was produced with a 1-ethyl-3-methylimidazolium bis(fluorosulfonyl)imide (EMIM-FSI, Panel C of FIG. 1) ionic liquid containing 1 M LiTFSI salt, which serves as a low-potential electrolyte on the anode side of the battery. Imidazolium-based ionic liquids were selected due to their low viscosity and resulting high ionic conductivity. In general, ionic conductivity of ionic liquids is related to their viscosity, and the viscosity allowing for ionic conductivity of >1 mS cm$^{-1}$ is considered to be "low" ionic conductivity. Otherwise, it may be considered to "high" ionic conductivity. In this exemplary example, we used low viscosity ionic liquids, but the heterostructure described in this invention could be demonstrated regardless of the viscosity. Furthermore, EMIM-TFSI was used for the high-potential ionogel electrolyte due to the oxidative stability of TFSI anions, and EMIM-FSI was employed for the low-potential ionogel electrolyte because FSI anions enable cathodic stability.

Figure 6:
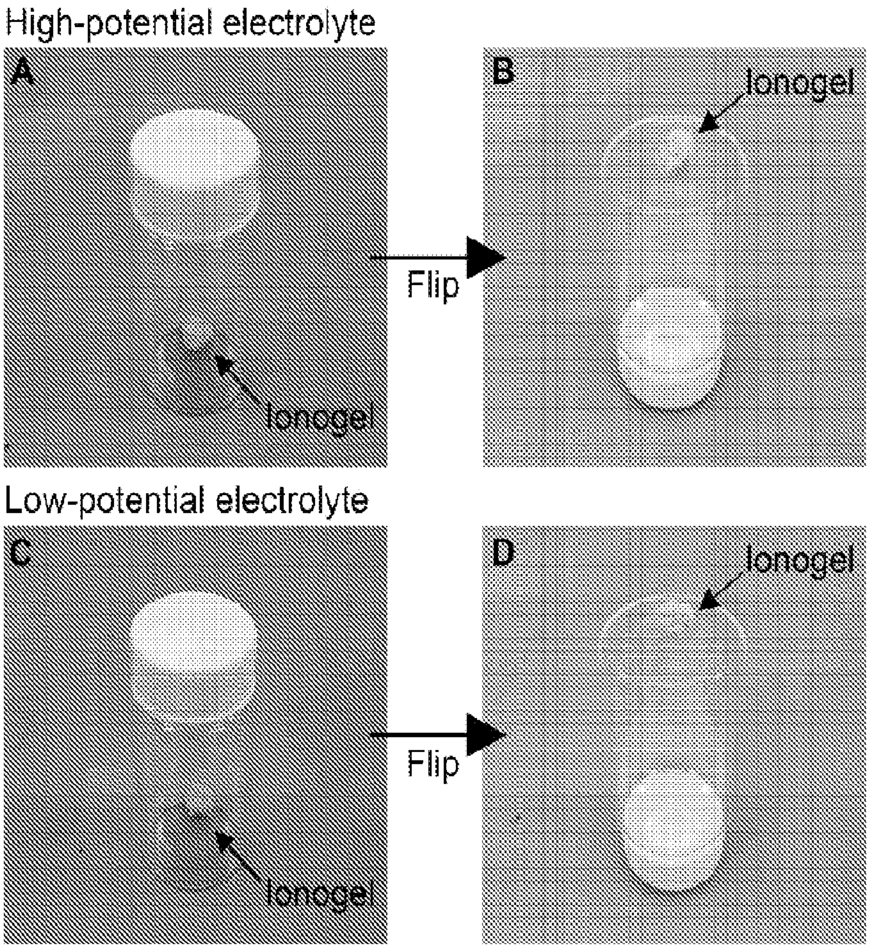
FIG. 6. Photographs of a vial with the high-potential and low-potential ionogel electrolyte, according to embodiments of the invention. Panels A-B: Photographs of a vial with the high-potential ionogel electrolyte (Panel A) before and (Panel B) after flipping. Panels C-D: Photographs of a vial with the low-potential ionogel electrolyte (Panel C) before and (Panel D) after flipping. The ionogels contained 60% ionic liquids and 40% hBN nanoplatelets by weight. The ionic liquids in the ionogels on the bottom of the inverted vials did not flow down due to the hBN nanoplatelets effectively immobilizing the ionic liquids.
Figure 7:
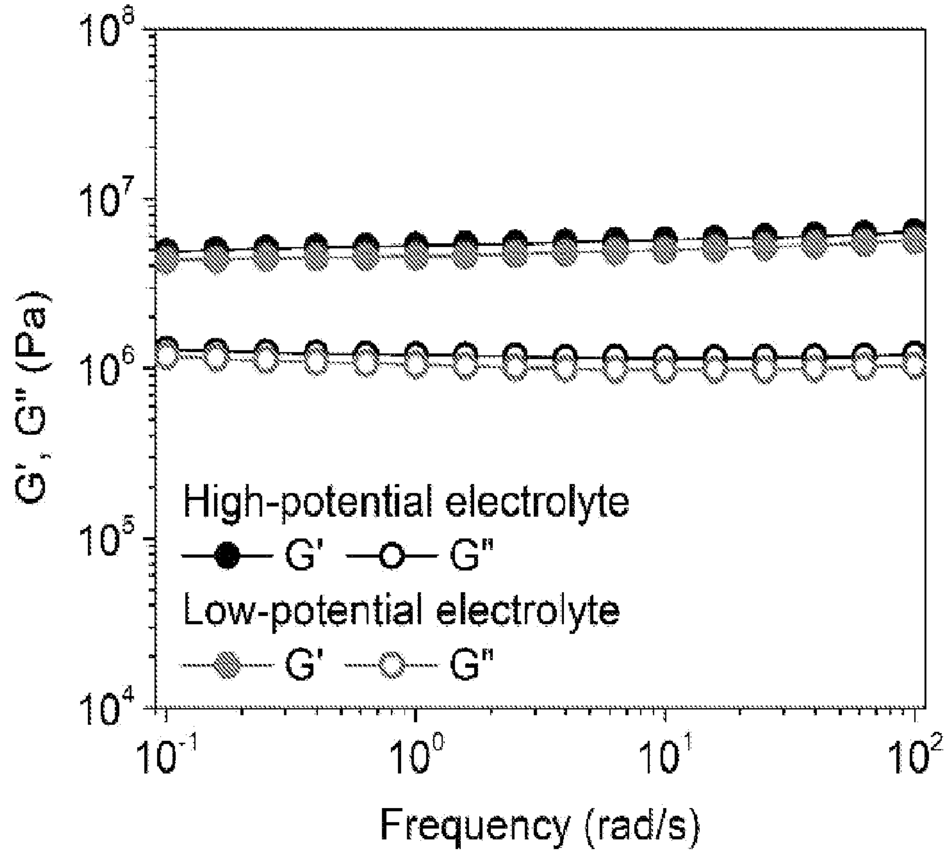
FIG. 7 shows viscoelastic properties of the high-potential and low-potential ionogel electrolytes as a function of frequency, according to embodiments of the invention. The storage (G') modulus being higher than the loss (G") modulus without considerable dependence on frequency confirms the strong solidification of the ionogel electrolytes.
Figure 8:
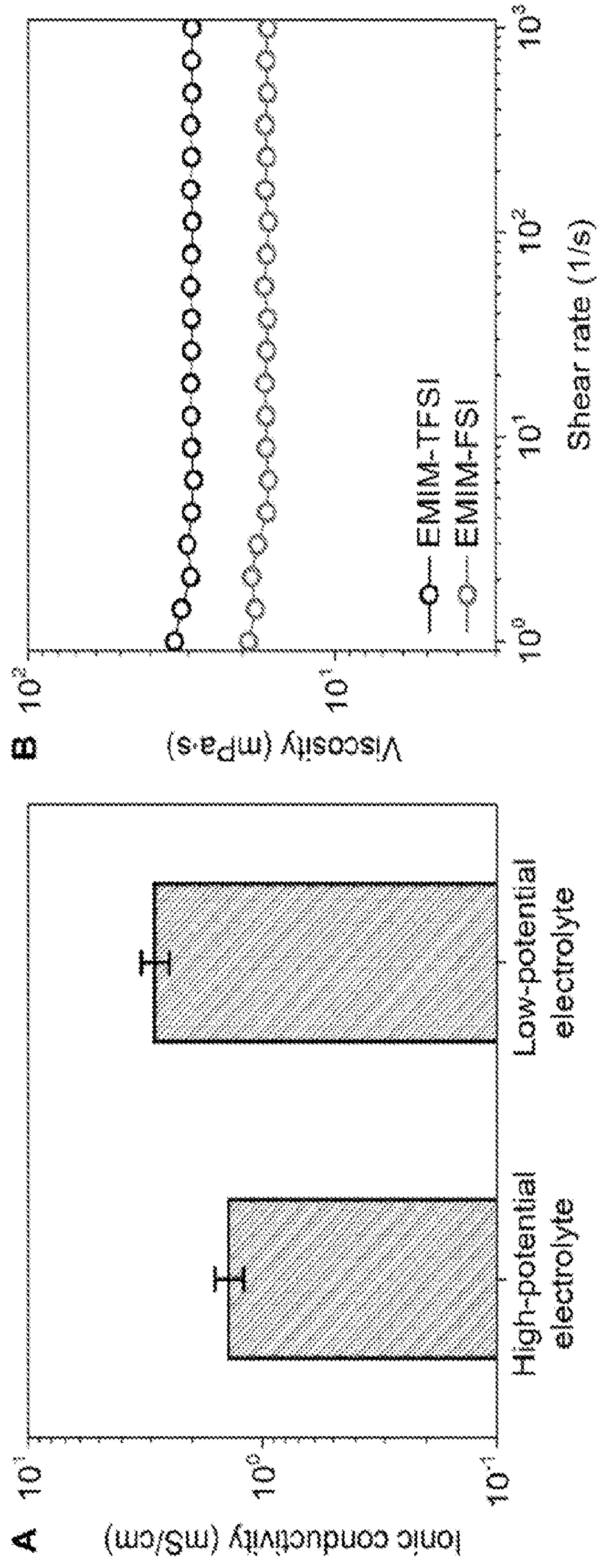
FIG. 8 shows properties of the high-potential and low-potential ionogel electrolytes, according to embodiments of the invention. Panel A: Room temperature ionic conductivity of the high-potential and low-potential ionogel electrolytes. Panel B: Viscosity of EMIM-TFSI and EMIM-FSI ionic liquids as a function of shear rate. The low-potential electrolyte possesses higher ionic conductivity than the high-potential electrolyte due to the lower intrinsic viscosity of EMIM-FSI compared to EMIM-TFSI.

Liquid-phase exfoliated hBN nanoplatelets (Panel D of FIG. 1) were used as the gelling solid matrix since hBN is electrically insulating, chemically inert, thermal stabile, and mechanically robust. In addition to these intrinsic material benefits, exfoliated hBN nanoplatelets provide large surface area that strongly confines the ionic liquids, which is confirmed by the negligible fluidic behavior (FIG. 6) of the ionic liquids in the ionogels. Due to this effective physical confinement, both the high-potential and low-potential electrolytes exhibited high mechanical strength (storage modulus>1 MPa, FIG. 7), eliminating the need for a separator in the battery assembly. In addition, the ionogel electrolytes showed favorable ionic conductivity (>1 mS cm$^{-1}$ at room temperature, FIG. 8) that enables high rate capability in lithium-ion batteries.

Anodic Stability of Ionogel Electrolytes

Figure 2:
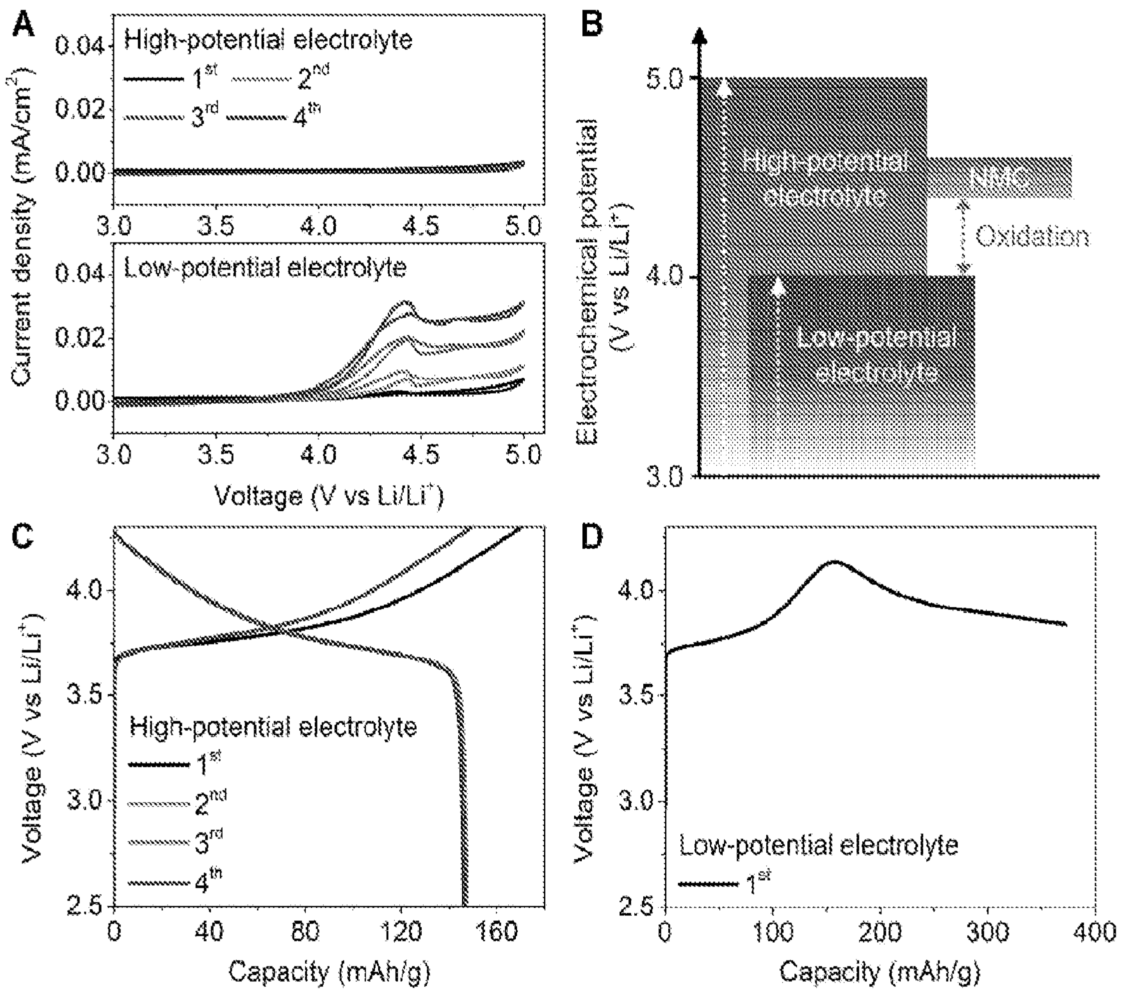
FIG. 2 shows anodic stability of the high-potential and low-potential ionogel electrolytes, according to embodiments of the invention. Panel A: Cyclic voltammograms of Li|electrolyte|stainless steel cells with the high-potential (top) and low-potential (bottom) ionogel electrolytes between 3.0 and 5.0 V (vs $Li/Li^+$) at a scan rate of 1 mV $s^{-1}$. Panel B: Schematic diagram of the anodic stability of the high-potential and low-potential ionogel electrolytes for lithium nickel manganese cobalt oxide ($LiNi_{0.33}Mn_{0.33}Co_{0.33}O_2$, NMC) half-cells. Panel C: Charge-discharge voltage profiles of an NMC half-cell with the high-potential ionogel electrolyte. Panel D: $1^{st}$ cycle charge voltage profile of an NMC half-cell with the low-potential ionogel electrolyte. The voltage range and charge-discharge rate for the NMC half-cells were 2.5-4.3 V (vs $Li/Li^+$) and 0.1 C, respectively.
Figure 9:
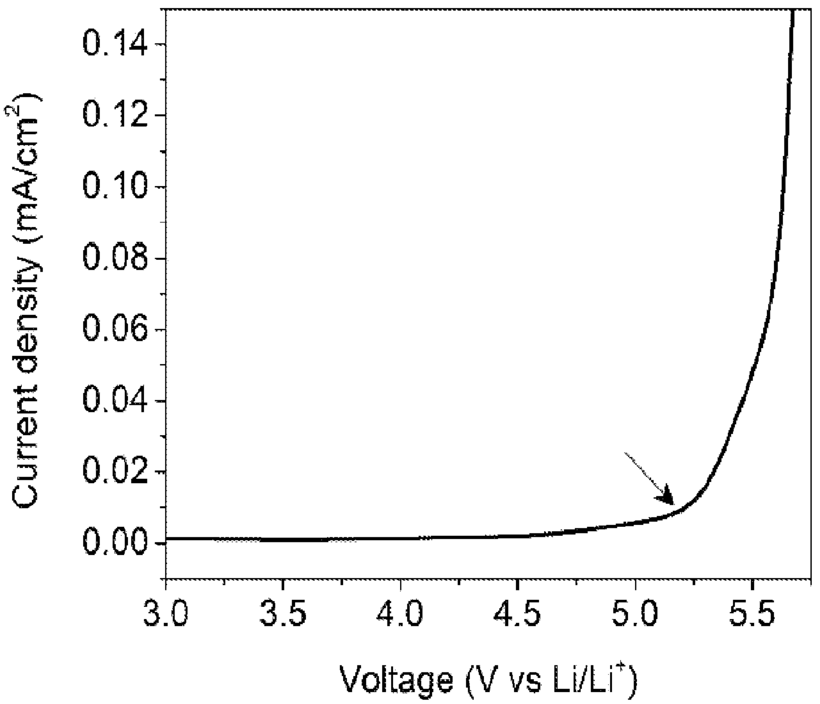
FIG. 9 shows linear sweep voltammogram of a Li|high-potential ionogel electrolyte|stainless steel cell at a scan rate of 1 mV $s^{-1}$, according to embodiments of the invention. The voltammogram presents the desirable anodic stability of the high-potential electrolyte up to 5.2 V (vs $Li/Li^+$).

Cyclic voltammetry (CV) was performed with Li|electrolyte|stainless steel cells to investigate the electrochemical stability windows of the high-potential and low-potential ionogel electrolytes. Panel A of FIG. 2 displays CV curves for the high-potential and low-potential ionogel electrolytes, which were acquired between 3.0 and 5.0 V (vs Li/Li$^+$) to observe their anodic stability. The high-potential ionogel electrolyte exhibited stable CV curves with negligible change in the current density, revealing anodic stability over 5 V (vs Li/Li$^+$, FIG. 9). In contrast, the low-potential ionogel electrolyte showed significant decomposition with increasing current density at >4 V (vs Li/Li$^+$), originating from the oxidation of FSI anions. To further confirm the anodic stability, half-cells with lithium nickel manganese cobalt oxide ($LiNi_{0.33}Mn_{0.33}Co_{0.33}O_2$, NMC) were tested using the high-potential and low-potential ionogel electrolytes, with a voltage range of 2.5-4.3 (vs Li/Li$^+$) at 0.1 C. As shown in Panel B of FIG. 2, the charge cutoff voltage is lower than the anodic limit of the high-potential ionogel electrolyte, but exceeds the anodic limit of the low-potential ionogel electrolyte, resulting in electrolyte oxidation. Accordingly, the NMC half-cell (Panel C of FIG. 2) with the high-potential ionogel electrolyte showed stable operation with typical voltage profiles and an initial discharge capacity of 146 mAh g$^{-1}$, whereas the NMC half-cell (Panel D of FIG. 2) with the low-potential ionogel electrolyte experienced severe degradation at >4 V (vs Li/Li$^+$) and did not reach the charge cutoff voltage, in agreement with the CV characterization.

Cathodic Stability of Ionogel Electrolytes

Figure 3:
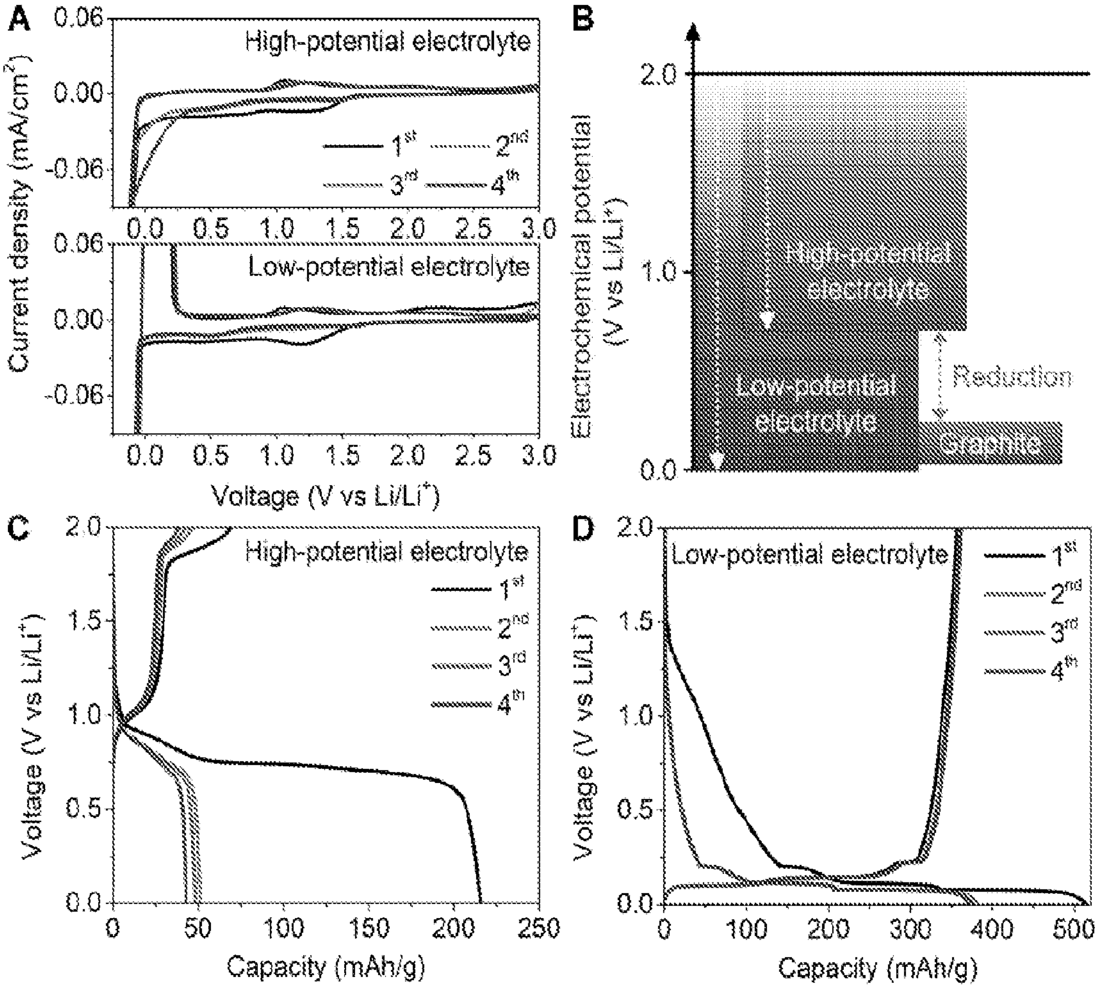
FIG. 3 shows cathodic stability of the high-potential and low-potential ionogel electrolytes, according to embodiments of the invention. Panel A: Cyclic voltammograms of Li|electrolyte|stainless steel cells with the high-potential (top) and low-potential (bottom) ionogel electrolytes between −0.2 and 3.0 V (vs $Li/Li^+$) at a scan rate of 1 mV $s^{-1}$. Panel B: Schematic diagram of the cathodic stability of the high-potential and low-potential ionogel electrolytes for graphite half-cells. Panels C-D: Charge-discharge voltage profiles of graphite half-cells with the (Panel C) high-potential and (Panel D) low-potential ionogel electrolytes. The voltage range and charge-discharge rate for the graphite half-cells were 0.01-2.0 V (vs $Li/Li^+$) and 0.1 C, respectively.
Figure 10:
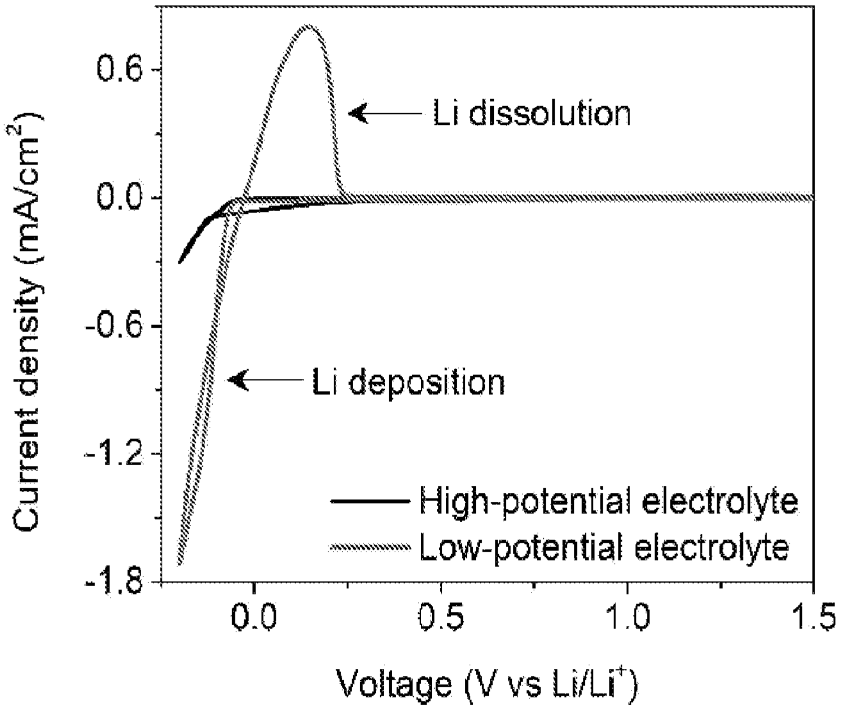
FIG. 10 shows cyclic voltammograms with a wider current density scale for the $4^{th}$ cycle of the Li|electrolyte|stainless steel cells in Panel A of FIG. 2. The voltammograms display cathodic (at <0 V vs $Li/Li^+$) and anodic (at ~0.2 V vs $Li/Li^+$) peaks that correspond to lithium deposition and dissolution, respectively, on the stainless steel electrode.

Panel A of FIG. 3 compares CV curves of Li|electrolyte|stainless steel cells with the high-potential and low-potential ionogel electrolytes, which were obtained between −0.2 and 3.0 V (vs Li/Li$^+$) to evaluate their cathodic stability. The cathodic peak starting at 1.5 V (vs Li/Li$^+$) in the 1$^{st}$ cycle, which was observed for both the high-potential and low-potential ionogel electrolytes, can likely be attributed to impurities in the ionic liquids. After the 1$^{st}$ cycle, the high-potential ionogel electrolyte showed a cathodic peak beginning at 0.7 V (vs Li/Li$^+$), which can be explained by reduction of the EMIM cations, with the current density of this peak increasing with additional cycling, implying the instability of the high-potential ionogel electrolyte at low potentials. In contrast, the low-potential ionogel electrolyte showed suppression of the EMIM decomposition peak and stable current density during cycling since FSI anions enhance the reductive stability of EMIM cations. Furthermore, the low-potential ionogel electrolyte showed a cathodic peak at <0 V (vs Li/Li$^+$) and an anodic peak at ~0.2 V (vs Li/Li$^+$), stemming from the deposition and dissolution of lithium on the stainless steel electrode (FIG. 10), respectively. On the other hand, the high-potential ionogel electrolyte exhibited an analogous cathodic peak at <0 V (vs Li/Li$^+$), but not a noticeable corresponding anodic peak, which suggests depletion of deposited lithium by reactions with the electrolyte because of its poor electrochemical stability at low potentials.

Figure 11:
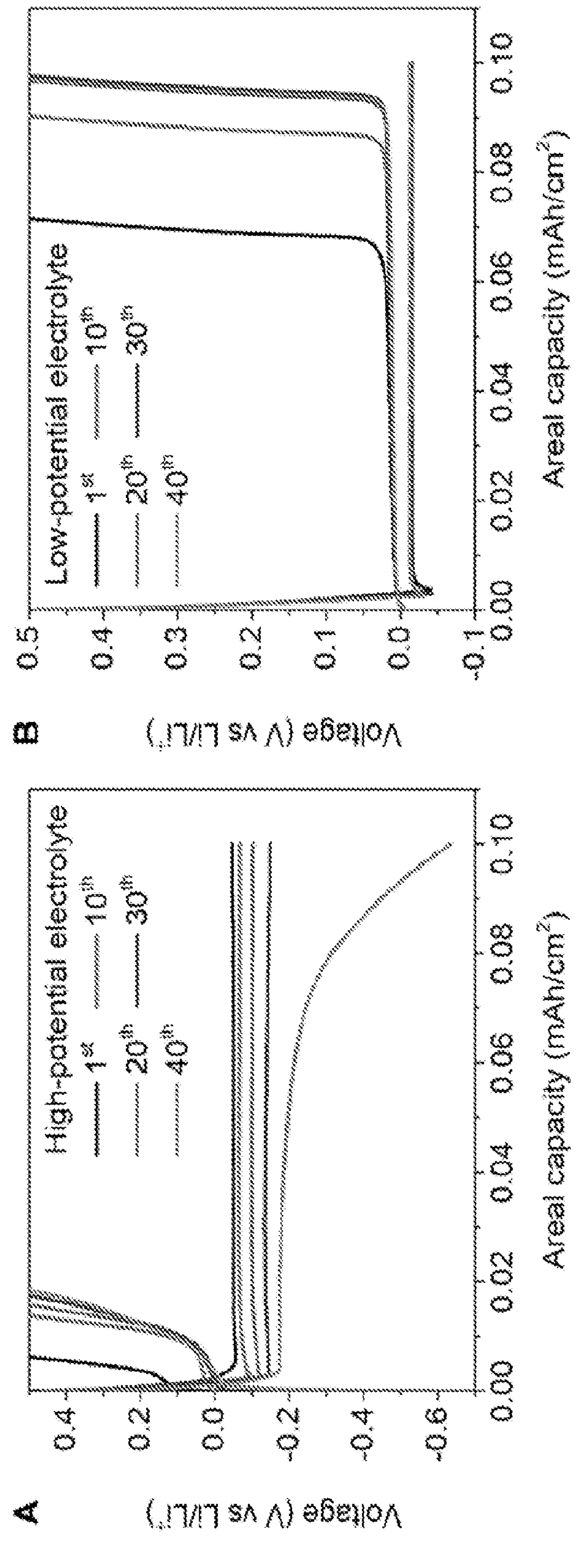
FIG. 11 shows voltage profiles for lithium plating-stripping tests of Li|electrolyte|Cu cells with the (Panel A) high-potential and (Panel B) low-potential ionogel electrolytes, according to embodiments of the invention. In the cells, lithium was plated on the copper electrode at a current density of 0.1 mA $cm^{-2}$ for 1 h (areal capacity: 0.1 mAh $cm^{-1}$), and stripped at the same current density with a cutoff voltage of 0.5 V (vs $Li/Li^+$).
Figure 12:
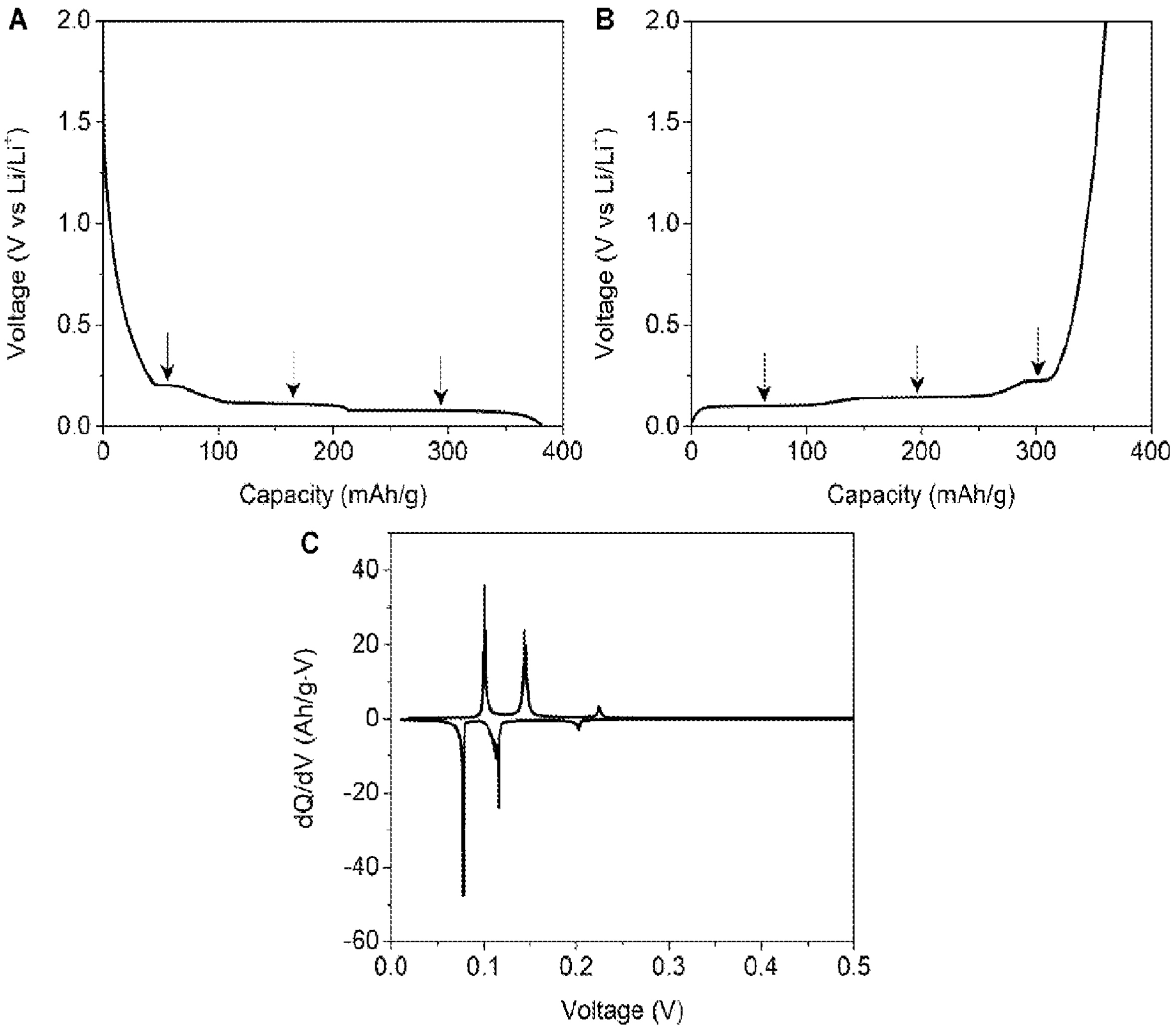
FIG. 12 shows voltage profiles of the graphite half-cell with the low-potential ionogel electrolyte, according to embodiments of the invention. Panel A: Charge voltage profiles of the graphite half-cell with the low-potential ionogel electrolyte. Panel B: discharge voltage profiles of the graphite half-cell with the low-potential ionogel electrolyte. The voltages plateaus of the graphite half-cell are indicated by arrows. Panel C: dQ/dV curves of the voltage profiles. The curves display peaks corresponding to the voltage plateaus upon charging and discharging.

The low-potential stability of the ionogel electrolytes was also examined by lithium plating-stripping tests with Li|electrolyte|Cu cells, in which lithium was plated onto the copper electrode at a fixed current density and then stripped from the copper electrode at the same current density, as shown in FIG. 11. Because the redox reactions occur at ~0 V (vs Li/Li$^+$) in this cell geometry, the tests allow the investigation of the ionogel electrolyte stability at low potentials by monitoring how much the deposited lithium is recovered from the copper electrode. During the tests, low Coulombic efficiency (stripped lithium/plated lithium<18%) was observed with the high-potential ionogel electrolyte, indicating intense reactions between the deposited lithium and electrolyte at low potentials. Alternatively, high Coulombic efficiency (as high as 98%) was accomplished with the low-potential ionogel electrolyte, which further verifies the cathodic stability of this electrolyte. Moreover, to investigate the compatibility with low-potential anode materials, graphite half-cells were tested using the ionogel electrolytes, with a voltage range of 0.01-2.0 V (vs $Li/Li^+$) at 0.1 C. As shown in Panel B of FIG. 3, the charge cutoff voltage is lower than the cathodic limit of the high-potential ionogel electrolyte, precluding stable graphite intercalation chemistry at low potentials. However, the charge cutoff voltage is higher than the cathodic limit of the low-potential ionogel electrolyte, implying electrochemical compatibility with the graphite anode. Indeed, while the graphite half-cell (Panel C of FIG. 3) with the high-potential ionogel electrolyte exhibited low capacity and undesirable voltage profiles, the graphite half-cell (Panel D of FIG. 3) with the low-potential ionogel electrolyte showed standard voltage profiles with well-defined plateaus (FIG. 12) and an initial discharge capacity of 357 mAh $g^{-1}$.

Figure 13:
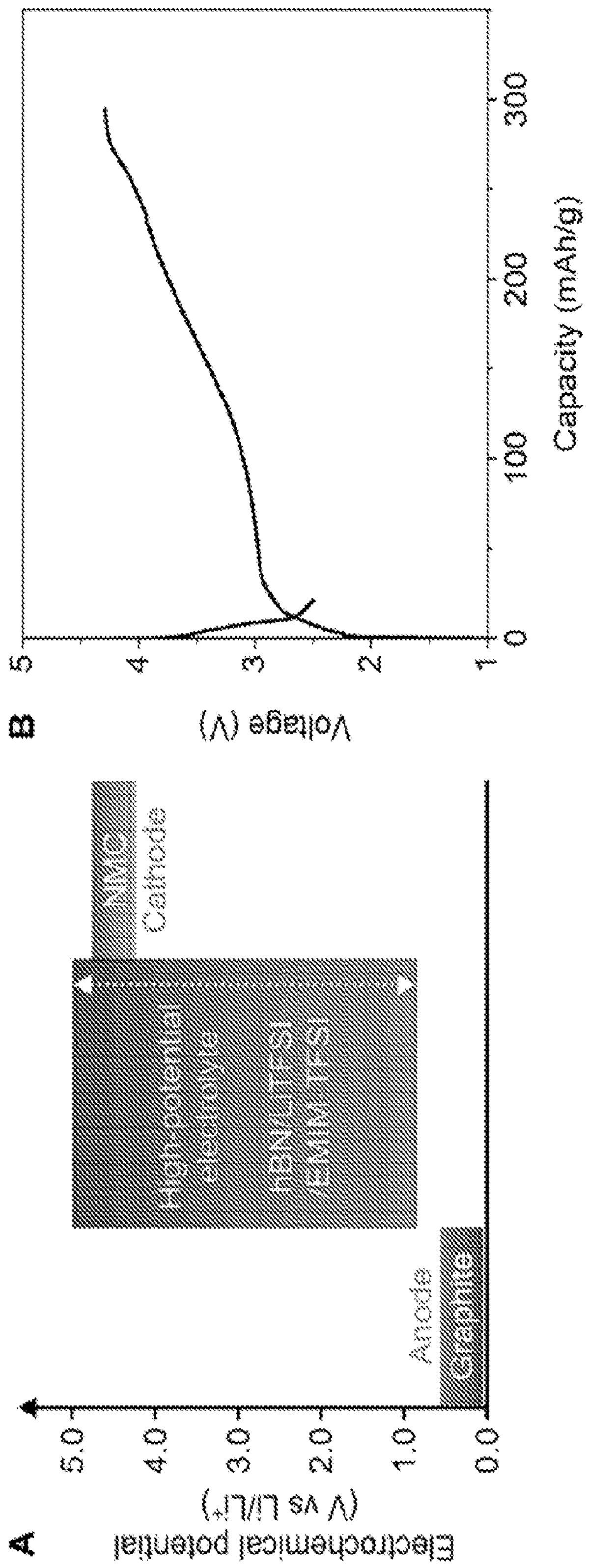
FIG. 13 shows characterization of an NMC-graphite full-cell with the high-potential ionogel electrolyte, according to embodiments of the invention. Panel A: Schematic diagram of the electrochemical window of the high-potential ionogel electrolyte for NMC-graphite full-cells. Panel B: $1^{st}$ cycle charge-discharge voltage profiles of the NMC-graphite full-cell with the high-potential ionogel electrolyte at 0.1 C.
Figure 14:
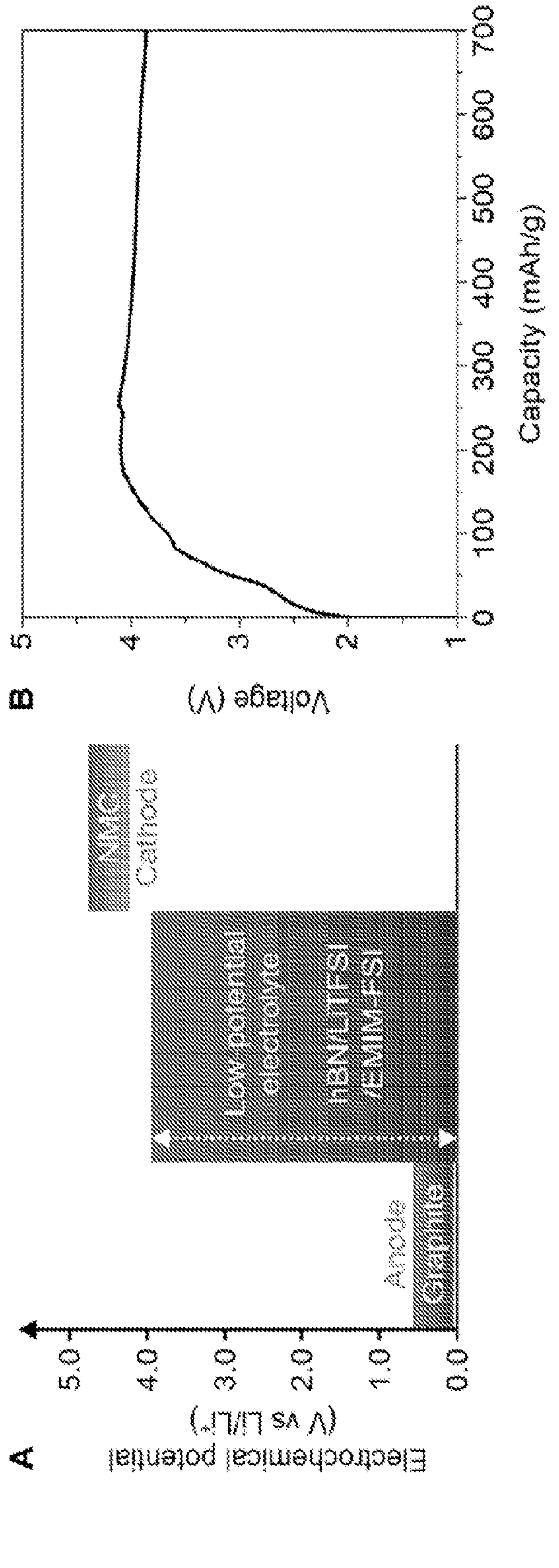
FIG. 14 shows characterization of an NMC-graphite full-cell with the low-potential ionogel electrolyte, according to embodiments of the invention. Panel A: Schematic diagram of the electrochemical window of the low-potential ionogel electrolyte for NMC-graphite full-cells. Panel B: $1^{st}$ cycle charge voltage profile of the NMC-graphite full-cell with the low-potential ionogel electrolyte at 0.1 C.

Full-Cell Lithium-Ion Batteries Based on Layered Heterostructure Ionogel Electrolytes The CV and half-cell results suggest that the individual electrochemical windows of the high-potential and low-potential ionogel electrolytes do not concurrently cover the NMC and graphite potentials, suggesting that neither of these electrolytes alone are appropriate for NMC-graphite full-cells. Indeed, an NMC-graphite full-cell (FIG. 13) with the high-potential ionogel electrolyte exhibited insignificant discharge capacity and Coulombic efficiency because the poor cathodic stability of this electrolyte hinders the graphite anode from hosting lithium ions. Similarly, the NMC-graphite full-cell (FIG. 14) with the low-potential ionogel electrolyte revealed acute degradation during charging and was not fully charged because this electrolyte undergoes serious oxidation at the interface with the NMC cathode due to its low anodic stability.

Figure 4:
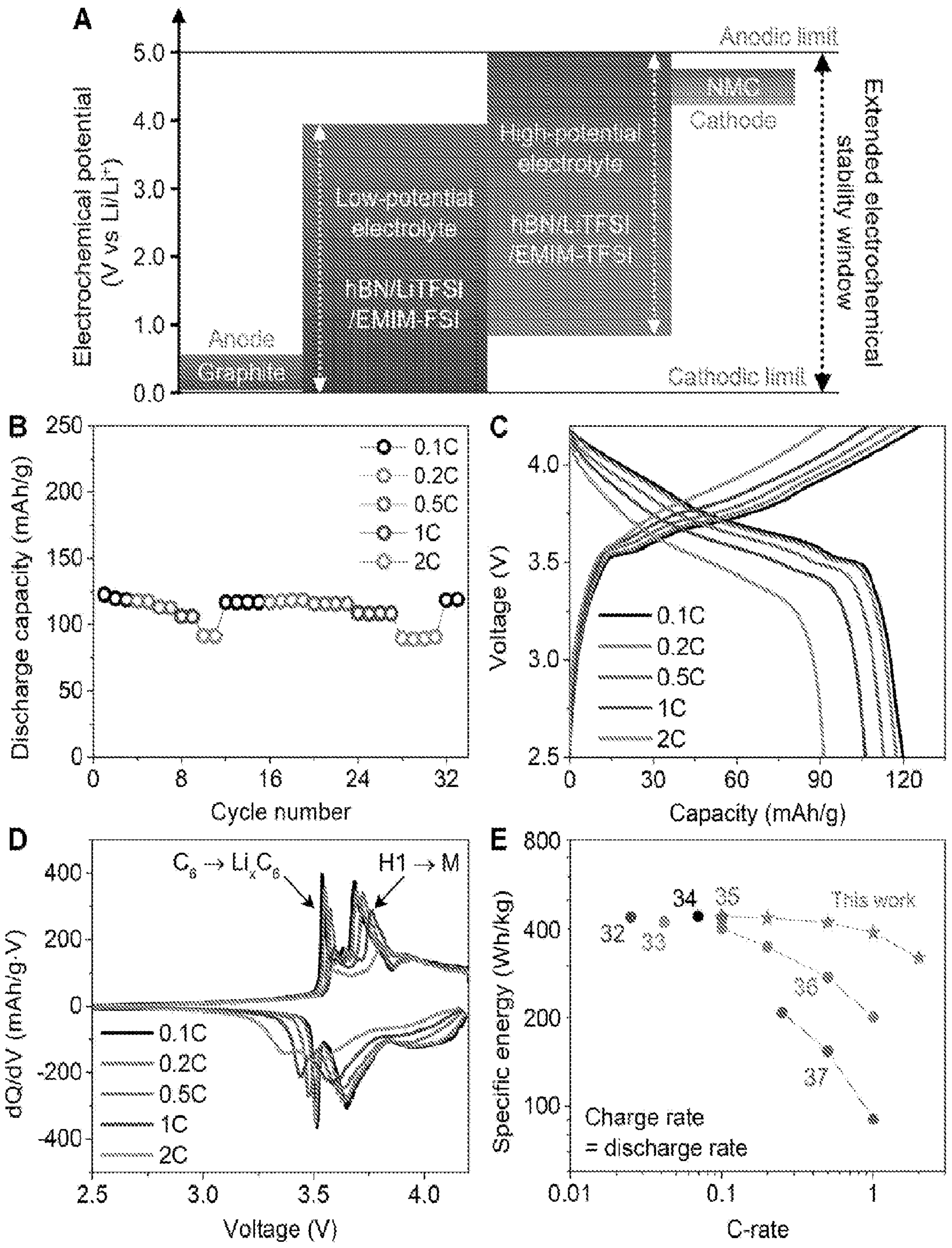
FIG. 4 shows NMC-graphite full-cells based on layered heterostructure ionogel electrolytes, according to embodiments of the invention. Panel A: Schematic diagram of the electrochemical window of the layered heterostructure ionogel electrolyte for NMC-graphite full-cells. Panel B: Specific discharge capacity of the NMC-graphite full-cell at different rates, with a voltage range of 2.5-4.2 V. Charge rates are the same as the discharge rates. Panel C: Charge-discharge voltage profiles for the NMC-graphite full-cell at different rates. Panel C: Corresponding differential capacity (dQ/dV) curves for the NMC-graphite full-cell at different rates. Panel E: Specific energy of the NMC-graphite full-cell as a function of the charge-discharge rate, in comparison to previously reported solid-state lithium-ion batteries with full-cell geometries. The specific energy is based on the cathode active material mass. The graph includes data obtained with equal charge-discharge rate modes, and the number labels refer to the citation number in the references.
Figure 15:
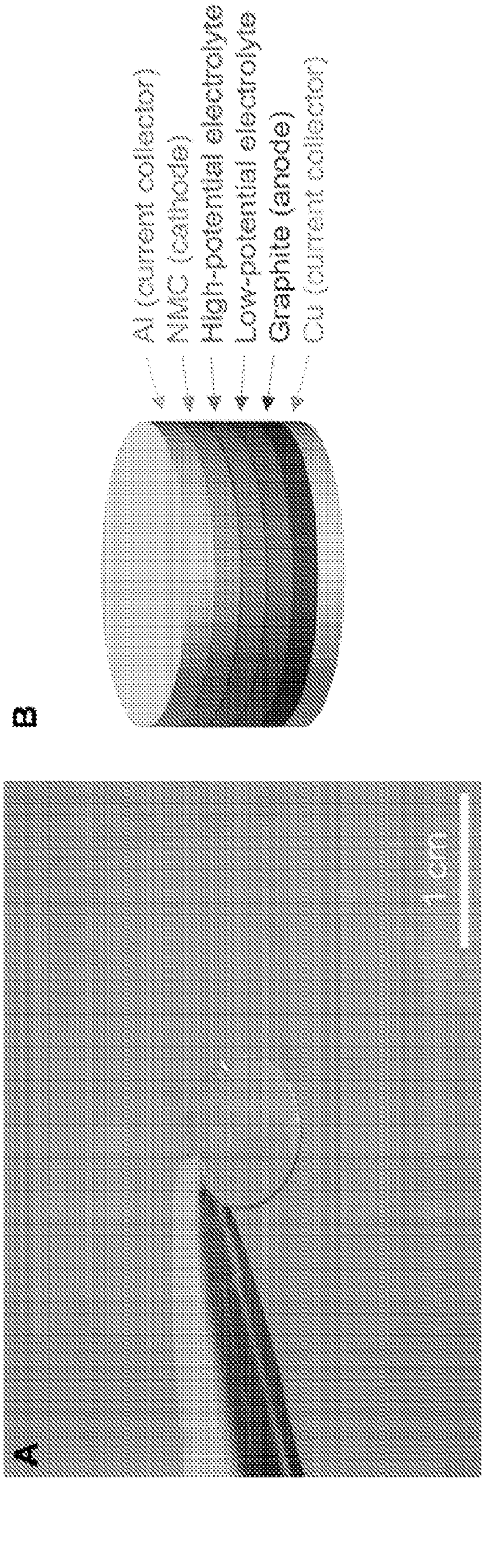
FIG. 15 an NMC-graphite full-cell using the layered heterostructure ionogel electrolyte, according to embodiments of the invention. Panel A: Photograph of the NMC-graphite full-cell using the layered heterostructure ionogel electrolyte. Panel B: schematic of the NMC-graphite full-cell using the layered heterostructure ionogel electrolyte.
Figure 16:
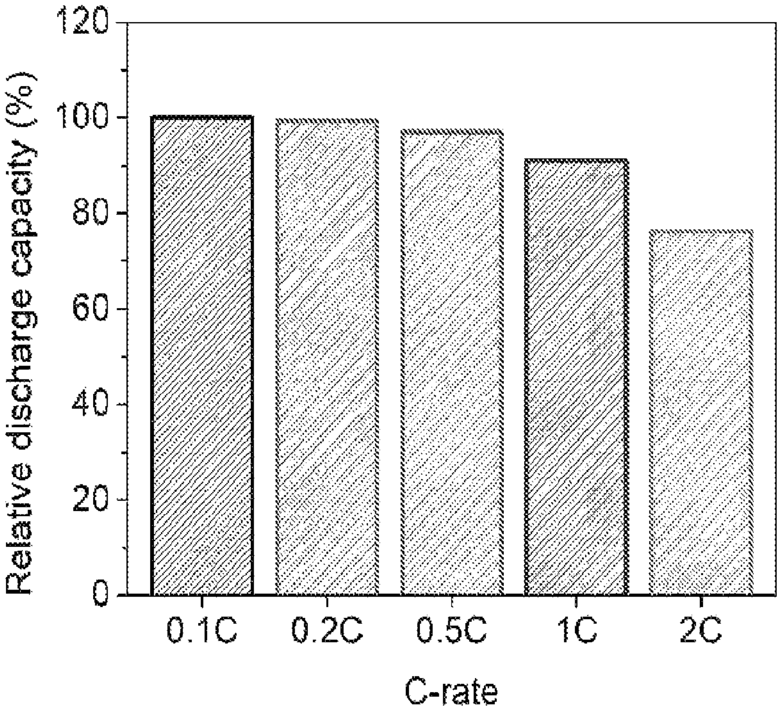
FIG. 16 shows relative discharge capacity of the NMC-graphite full-cell based on the layered heterostructure ionogel electrolyte at different C-rates, which is normalized to the discharge capacity at 0.1 C, according to embodiments of the invention. The relative discharge capacity is based on the average discharge capacity at each C-rate in Panel B of FIG. 4.

To overcome these issues, NMC-graphite full-cells were fabricated using the layered heterostructure ionogel electrolyte, as depicted in Panel A of FIG. 4. In this battery architecture (FIG. 15), the high-potential ionogel electrolyte contacts NMC to stabilize the interface with the cathode, and the low-potential ionogel electrolyte contacts graphite to stabilize the interface with the anode. In this manner, the NMC-graphite full-cell exhibited typical voltage profiles shown in Panel C of FIG. 4 and differential capacity curves shown in Panel D of FIG. 4. In particular, the differential capacity curves showed two major peaks on charging, associated with the lithium intercalation into graphite ($C_6 \rightarrow Li_xC_6$) and the NMC phase transition from a hexagonal to monoclinic (H1→M) lattice, as well as their inverse peaks on discharging. Consequently, the differential capacity curves reveal that the layered heterostructure ionogel electrolyte induces desirable NMC-graphite full-cell chemistry. Furthermore, the initial discharge capacity of the full-cell (Panel B of FIG. 4) was measured to be 123 mAh $g^{-1}$ at 0.1 C, and over 91% of the discharge capacity (FIG. 16) at 0.1 C was retained at 1 C, thus demonstrating high rate capability for a solid-state lithium-ion battery.

Panel E of FIG. 4 shows the specific energy of the NMC-graphite full-cell with the layered heterostructure ionogel electrolyte as a function of the charge-discharge rate, in comparison to previously reported solid-state lithium-ion batteries with full-cell geometries. The specific energy was calculated on the basis of the cathode active material mass as was done in the comparative studies. Several solid-state lithium-ion batteries with favorable voltages have been demonstrated using inorganic solid-state electrolytes with additional coating layers on the electrodes for interfacial stabilization (Table 1), but large specific energies have typically been accomplished at low charge-discharge rates. In contrast, lithium-ion batteries based on the layered heterostructure ionogel electrolyte exhibited comparable specific energy without electrode coatings at low rates, as well as significant retention of the specific energy at high rates. In particular, the specific energy of the full-cell with the layered heterostructure ionogel electrolyte at 1 C is at least two times greater than that of previously reported solid-state lithium-ion batteries at the same rate. This high rate performance can be attributed to the favorable ionic conductivity and interfacial properties of the layered heterostructure ionogel electrolyte. Overall, this favorable comparison to literature precedent demonstrates that the layered heterostructure ionogel electrolyte not only enables high energy density, but also enhances the rate capability of solid-state lithium-ion batteries.

TABLE 1

Electrodes, electrolytes, and operating temperatures of previously reported solid-state lithium-ion batteries.

Figure 5:
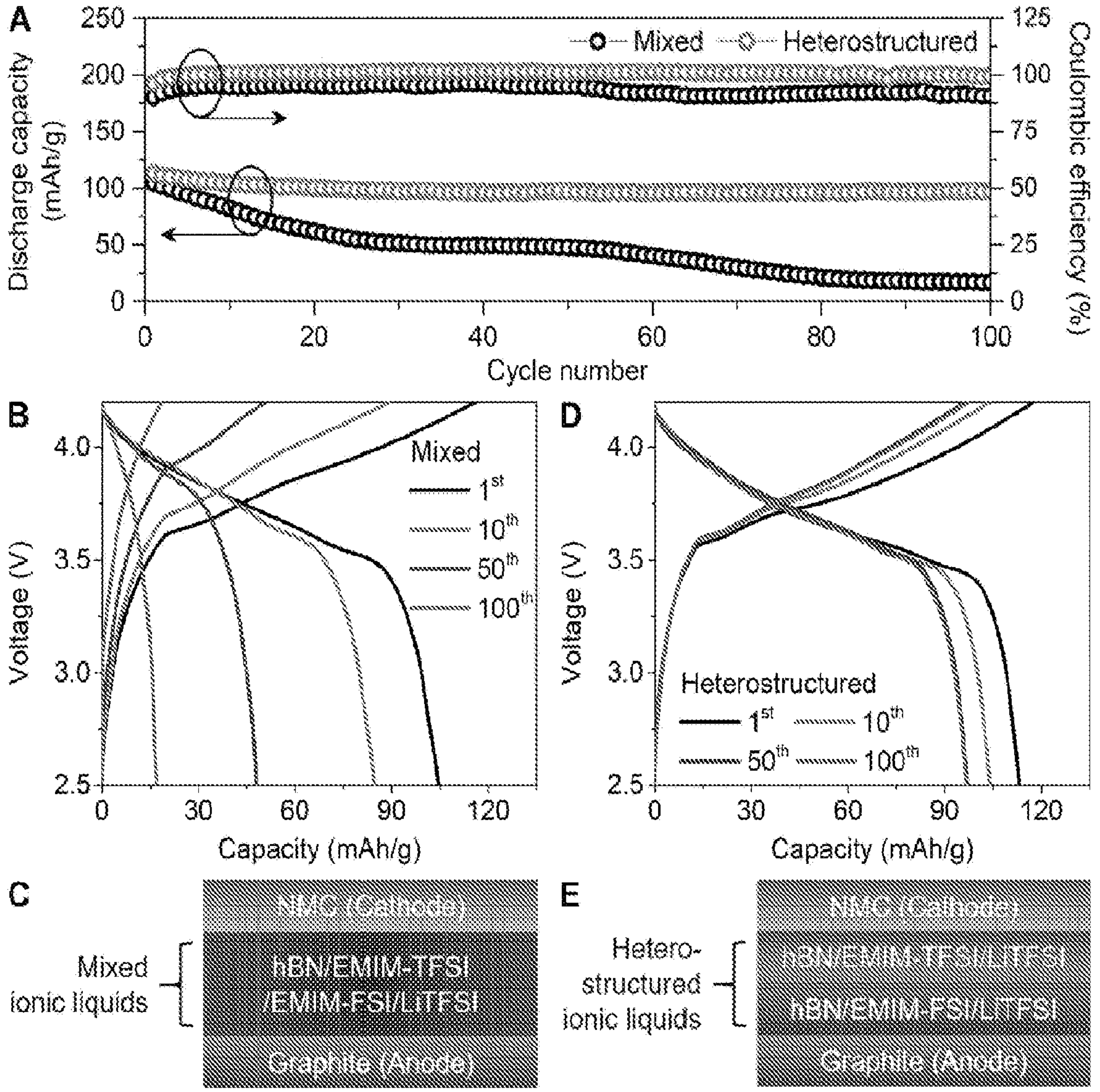
FIG. 5 shows comparison of NMC-graphite full-cells with mixed and layered heterostructure ionogel electrolytes, according to embodiments of the invention. Panel A: Discharge capacity and Coulombic efficiency of NMC-graphite full-cells with mixed and layered heterostructure ionogel electrolytes at a charge-discharge rate of 0.5 C. The mixed ionogel electrolyte was prepared with 50% EMIM-TESI/LiTFSI and 50% EMIM-FSI/LiTFSI by weight. Panel B: Charge-discharge voltage profiles of the NMC-graphite full-cell with the mixed ionogel electrolyte. Panel C: Schematic of the NMC-graphite full-cell with the mixed ionogel electrolyte. Panel D: Charge-discharge voltage profiles of the NMC-graphite full-cell with the layered heterostructure ionogel electrolyte. Panel E: Schematic of the NMC-graphite full-cell with the layered heterostructure ionogel electrolyte.
Figure 17:
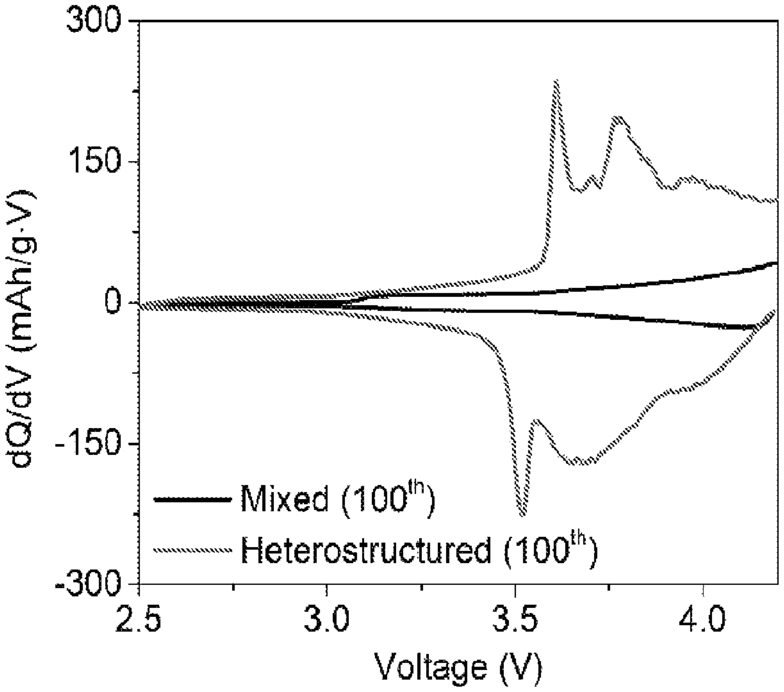
FIG. 17 shows dQ/dV curves corresponding to the voltage profiles for the $100^{th}$ cycle in Panels B-D of FIG. 5. After 100 cycles, the control cell with the mixed ionogel electrolyte completely lost the redox peaks of the graphite intercalation and NMC phase transition, whereas the NMC-graphite full-cell with the layered heterostructure ionogel electrolyte retained the peaks.
Figure 18:
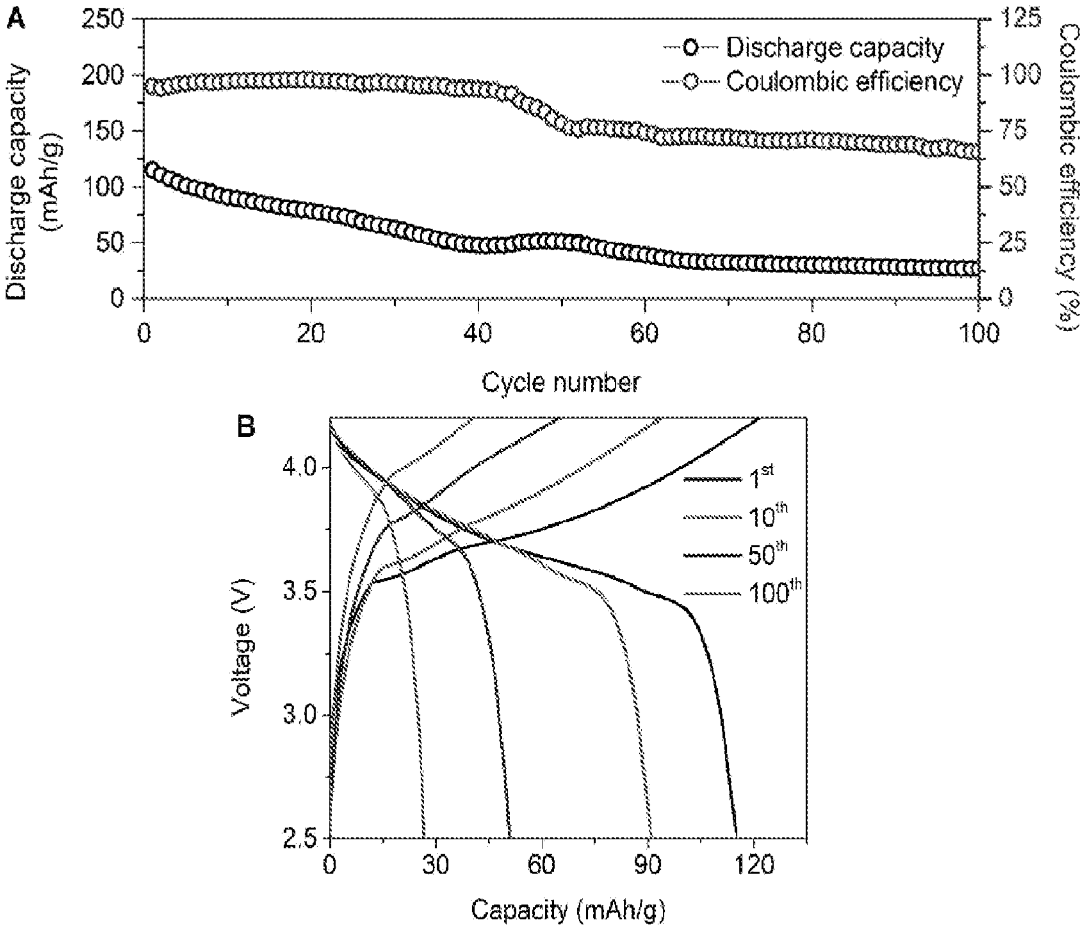
FIG. 18 shows capacity retention of NMC-graphite full-cells, according to embodiments of the invention. The mixed ionic liquid electrolyte was prepared with 50% EMIM-TFSI/LiTFSI and 50% EMIM-FSI/LiTFSI by weight. The cell was assembled with a glass microfiber filter as a separator. Panel A: capacity retention of this full-cell. Panel B: Charge-discharge voltage profiles of this full-cell.
Figure 19:
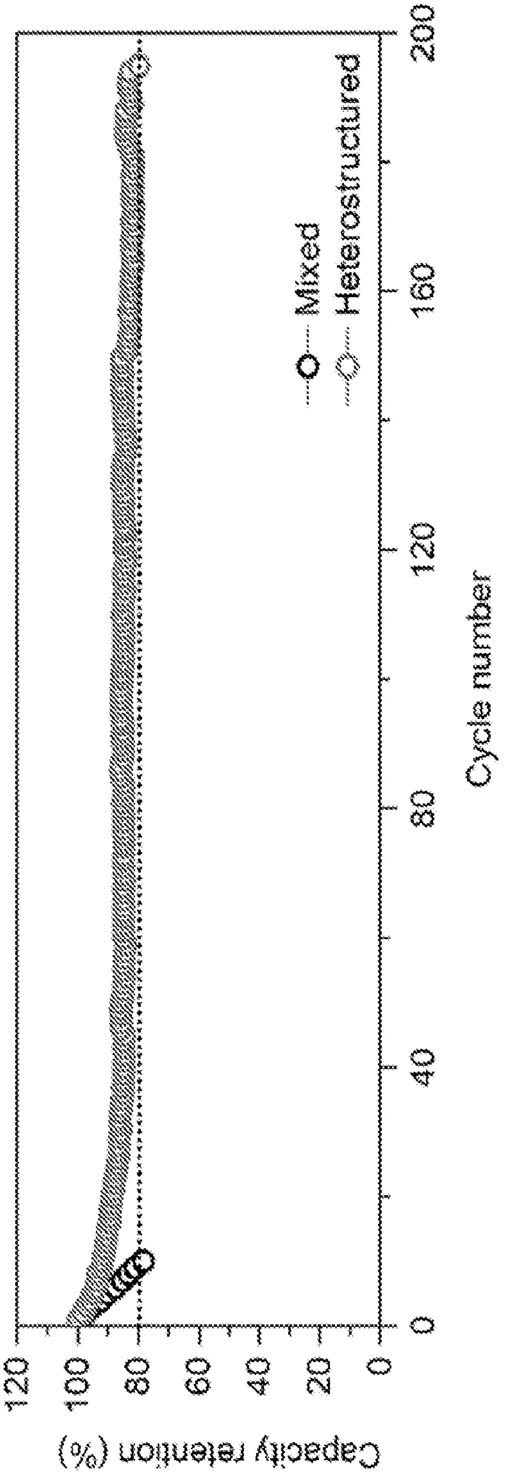
FIG. 19 shows capacity retention of NMC-graphite full-cells with the mixed and layered heterostructure ionogel electrolytes at a charge-discharge rate of 0.5 C, according to embodiments of the invention. The full-cells with the mixed and layered heterostructure ionogel electrolytes maintained greater than 80% of their initial capacity for 9 and 194 cycles, respectively. The dotted line indicates the capacity retention of 80%.

| Reference number | Cathode | Electrolyte | Anode | Operating temperature (° C.) |
|---|---|---|---|---|
| 32 | $LiNbO_3$-coated $LiNi_{0.6}Co_{0.2}Mn_{0.2}O_2$ | $Li_6PS_5Cl$ | Graphite | 25 |
| 33 | $LiNbO_3$-coated $LiNi_{0.33}Co_{0.33}Mn_{0.33}O_2$ | $75Li_2S \cdot 25P_2S_5$ | Graphite | 30 |
| 34 | $LiNbO_3$-coated $LiNi_{0.33}Co_{0.33}Mn_{0.33}O_2$ | $75Li_2S \cdot 25P_2S_5$ | Graphite | Room temperature |
| 35 | $LiNbO_3$-coated $LiCoO_2$ | $Li_{10}GeP_2S_{12}$, $Li_{9.6}P_3S_{12}$ | Graphite | 25 |
| 36 | $LiNbO_3$-coated $LiCoO_2$ | $Li_6PS_5Cl$ | Graphite | 30 |
| 37 | $LiNi_{0.6}Co_{0.2}Mn_{0.2}O_2$ | $Li_{6.6}P_{0.4}Ge_{0.6}S_5I$ | $Li_4Ti_5O_{12}$ | 60 |

layered heterostructure electrolyte offers an extended electrochemical window that fully covers the NMC cathode and graphite anode potentials in the full-cell geometry. Panel B of FIG. 4 displays the specific discharge capacity of this full-cell measured over multiple charge-discharge rates with a voltage range of 2.5-4.2 V. Regardless of the rate, the The cycling performance of the NMC-graphite full-cell based on the layered heterostructure ionogel electrolyte was evaluated at 0.5 C, as shown in Panel A of FIG. 5. A control cell was also tested using an ionogel electrolyte prepared with mixed ionic liquids (i.e., 50% EMIM-TFSI/LiTFSI and 50% EMIM-FSI/LiTFSI by weight) to elucidate the importance of layering the ionic liquids for the expanded electrochemical window. Compared to the full-cell with the layered heterostructure ionogel electrolyte, the control cell showed comparable initial capacity, but the capacity faded significantly with lower Coulombic efficiency and considerable voltage profile degradation, as shown in Panel B of FIG. 5 and FIG. 17. Similar results were also observed for an NMC-graphite full-cell (FIG. 18) using the mixed ionic liquid electrolyte without hBN nanoplatelets, revealing that the influence of the hBN matrix on the electrochemical performance was limited. The poor performance of the control cell can be attributed to the mixed electrolyte structure, in which both the high-potential and low-potential ionic liquids are in contact with the cathode and anode, as shown in Panel C of FIG. 5. The mixed structure leads to side reactions between the high-potential (or low-potential) ionic liquid and anode (or cathode), which results in rapid cell degradation. However, the full-cell with the layered heterostructure ionogel electrolyte exhibited superior cycling performance (Panel A of FIG. 5 and FIG. 19) with minimal changes in the voltage profiles (Panel D of FIG. 5) during cycling since the layered structure (Panel E of FIG. 5) prevents each ionic liquid from contacting its incompatible electrode. Furthermore, the strong interactions between the ionic liquids and the hBN nanoplatelets ensure that they remain localized in their respective layers, thus minimizing intermixing even following extended cycling. Therefore, the cycling performance reveals that the layered heterostructure ionogel electrolyte enables the extension of electrochemical windows for solid-state lithium-ion batteries, while minimizing the side effects of combining two ionic liquids.

Briefly, the invention in certain aspects discloses layered heterostructure ionogel electrolytes with two different imidazolium ionic liquids and hBN nanoplatelets to achieve wide electrochemical stability for solid-state lithium-ion batteries. In some embodiments, each ionogel electrolyte provides a different electrochemical window to allow stability against both the high-potential cathode and the low-potential anode, with the hBN nanoplatelets providing a large surface area to immobilize the ionic liquids and thus minimize intermixing at the heterointerface. The combined electrochemical windows enable the fabrication of full-cell solid-state lithium-ion batteries with voltages that are unachievable with the individual ionic liquids. Compared to ionogel electrolytes using mixed ionic liquids, the layered heterostructure ionogel electrolyte allows the extension of electrochemical windows without the side effects of combining two different ionic liquids, resulting in significantly enhanced cycling performance. Moreover, the layered heterostructure ionogel electrolytes preserve the high ionic conductivity of the constituent ionic liquids, leading to unprecedented rate performance for high-energy-density solid-state lithium-ion batteries. Overall, while demonstrated here for solid-state lithium-ion batteries, this layered heterostructure ionogel electrolyte approach can be generalized to other emerging solid-state battery technologies.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the invention pertains without departing from its spirit and scope. Accordingly, the scope of the invention is defined by the appended claims rather than the foregoing description and the exemplary embodiments described therein.

Some references, which may include patents, patent applications, and various publications, are cited and discussed in the description of this invention. The citation and/or discussion of such references is provided merely to clarify the description of the invention and is not an admission that any such reference is "prior art" to the invention described herein. All references cited and discussed in this specification are incorporated herein by reference in their entireties and to the same extent as if each reference was individually incorporated by reference.

LIST OF REFERENCES

[1]. R. Schmuch, R. Wagner, G. Hörpel, T. Placke, M. Winter, Performance and cost of materials for lithium-based rechargeable automotive batteries. Nat. Energy 3, 267-278 (2018).

[2]. M. Li, J. Lu, Z. Chen, K. Amine, 30 years of lithium-ion batteries. Adv. Mater. 30, 1800561 (2018).

[3]. A. Manthiram, X. Yu, S. Wang, Lithium battery chemistries enabled by solid-state electrolytes. Nat. Rev. Mater. 2, 16103 (2017).

[4]. D. H. Tan, A. Banerjee, Z. Chen, Y. S. Meng, From nanoscale interface characterization to sustainable energy storage using all-solid-state batteries. Nat. Nanotechnol. 15, 170-180 (2020).

[5]. J. Le Bideau, L. Viau, A. Vioux, Ionogels, ionic liquid based hybrid materials. Chem. Soc. Rev. 40, 907-925 (2011).

[6]. N. Chen, H. Zhang, L. Li, R. Chen, S. Guo, Ionogel electrolytes for high-performance lithium batteries: a review. Adv. Energy Mater. 8, 1702675 (2018).

[7]. M.-T. F. Rodrigues et al., A materials perspective on Li-ion batteries at extreme temperatures. Nat. Energy 2, 17108 (2017).

[8]. S. S. Moganty, N. Jayaprakash, J. L. Nugent, J. Shen, L. A. Archer, Ionic-liquid-tethered nanoparticles: hybrid electrolytes. Angew. Chem. 122, 9344-9347 (2010).

[9]. X. Chen et al., Silica gel solid nanocomposite electrolytes with interfacial conductivity promotion exceeding the bulk Li-ion conductivity of the ionic liquid electrolyte filler. Sci. Adv. 6, eaav3400 (2020).

[10]. Z. Wang et al., A metal-organic-framework-based electrolyte with nanowetted interfaces for high-energy-density solid-state lithium battery. Adv. Mater. 30, 1704436 (2018).

[11]. D. S. Ashby, R. H. DeBlock, C.-H. Lai, C. S. Choi, B. S. Dunn, Patternable, solution-processed ionogels for thin-film lithium-ion electrolytes. Joule 1, 344-358 (2017).

[12]. G. Tan et al., Solid-state Li-ion batteries using fast, stable, glassy nanocomposite electrolytes for good safety and long cycle-life. Nano Lett. 16, 1960-1968 (2016).

[13]. A. Eftekhari, Y. Liu, P. Chen, Different roles of ionic liquids in lithium batteries. J. Power Sources 334, 221-239 (2016).

[14]. A. Lewandowski, A. Świderska-Mocek, Ionic liquids as electrolytes for Li-ion batteries—An overview of electrochemical studies. J. Power Sources 194, 601-609 (2009).

[15]. B. Garcia, S. Lavallée, G. Perron, C. Michot, M. Armand, Room temperature molten salts as lithium battery electrolyte. Electrochim. Acta 49, 4583-4588 (2004).

[16]. A. Swiderska-Mocek, Electrolyte based on 1-ethyl-3-vinylimidazolium bis(trifluoromethanesulphonyl)imide for Li-ion batteries. Electrochim. Acta 132, 504-511 (2014).

[17]. X. Cao et al., High voltage LiNi0.5Mn1.5O4/Li4Ti5O12 lithium ion cells at elevated temperatures: carbonate-versus ionic liquid-based electrolytes. ACS Appl. Mater. Interfaces 8, 25971-25978 (2016).

[18]. M. Moreno et al., Ionic liquid electrolytes for safer lithium batteries. J. Electrochem. Soc. 164, A6026-A6031 (2016).

[19]. M. Egashira, H. Todo, N. Yoshimoto, M. Morita, J.-I. Yamaki, Functionalized imidazolium ionic liquids as electrolyte components of lithium batteries. J. Power Sources 174, 560-564 (2007).

[20]. M. Kerner, N. Plylahan, J. Scheers, P. Johansson, Ionic liquid based lithium battery electrolytes: fundamental benefits of utilising both TFSI and FSI anions?. Phys. Chem. Chem. Phys. 17, 19569-19581 (2015).

[21]. H. Srour, H. Rouault, C. Santini, Imidazolium based ionic liquid electrolytes for Li-ion secondary batteries based on graphite and LiFePO4. J. Electrochem. Soc. 160, A66-A69 (2013).

[22]. T. Sato, T. Maruo, S. Marukane, K. Takagi, Ionic liquids containing carbonate solvent as electrolytes for lithium ion cells. J. Power Sources 138, 253-261 (2004).

[23]. E. Simonetti et al., Towards Li(Ni0.33Mn0.33Co0.33)O2/graphite batteries with ionic liquid-based electrolytes. I. Electrodes' behavior in lithium half-cells. J. Power Sources 331, 426-434 (2016).

[24]. H. Matsumoto, H. Sakaebe, K. Tatsumi, Preparation of room temperature ionic liquids based on aliphatic onium cations and asymmetric amide anions and their electrochemical properties as a lithium battery electrolyte. J. Power Sources 146, 45-50 (2005).

[25]. M. Ishikawa, T. Sugimoto, M. Kikuta, E. Ishiko, M. Kono, Pure ionic liquid electrolytes compatible with a graphitized carbon negative electrode in rechargeable lithium-ion batteries. J. Power Sources 162, 658-662 (2006).

[26]. D. M. Piper et al., Stable silicon-ionic liquid interface for next-generation lithium-ion batteries. Nat. Commun. 6, 6230 (2015).

[27]. W. J. Hyun et al., High-modulus hexagonal boron nitride nanoplatelet gel electrolytes for solid-state rechargeable lithium-ion batteries. ACS nano 13, 9664-9672 (2019).

[28]. G. B. Appetecchi et al., Lithium insertion in graphite from ternary ionic liquid-lithium salt electrolytes: I. Electrochemical characterization of the electrolytes. J. Power Sources 192, 599-605 (2009).

[29]. M. Yamagata et al., Charge-discharge behavior of graphite negative electrodes in bis(fluorosulfonyl)imide-based ionic liquid and structural aspects of their electrode/electrolyte interfaces. Electrochim. Acta 110, 181-190 (2013).

[30]. W. Li, J. N. Reimers, J. R. Dahn, In situ x-ray diffraction and electrochemical studies of Li1−xNiO2. Solid State Ion. 67, 123-130 (1993).

[31]. H.-J. Noh, S. Youn, C. S. Yoon, Y.-K. Sun, Comparison of the structural and electrochemical properties of layered Li[NixCoyMnz]O2 (x=⅓, 0.5, 0.6, 0.7, 0.8 and 0.85) cathode material for lithium-ion batteries. J. Power Sources 233, 121-130 (2013).

[32]. Y. J. Nam, D. Y. Oh, S. H. Jung, Y. S. Jung, Toward practical all-solid-state lithium-ion batteries with high energy density and safety: comparative study for electrodes fabricated by dry- and slurry-mixing processes. J. Power Sources 375, 93-101 (2018).

[33]. A. Sakuda et al., All-solid-state battery electrode sheets prepared by a slurry coating process. J. Electrochem. Soc. 164, A2474-A2478 (2017).

[34]. M. Yamamoto, Y. Terauchi, A. Sakuda, M. Takahashi, Binder-free sheet-type all-solid-state batteries with enhanced rate capabilities and high energy densities. Sci. Rep. 8, 1212 (2018).

[35]. Y. Kato et al., High-power all-solid-state batteries using sulfide superionic conductors. Nat. Energy 1, 16030 (2016).

[36]. D. H. Kim et al., Infiltration of solution-processable solid electrolytes into conventional Li-ion-battery electrodes for all-solid-state Li-ion batteries. Nano Lett. 17, 3013-3020 (2017).

[37]. M. A. Kraft et al., Inducing high ionic conductivity in the lithium superionic argyrodites Li6+xP1−xGexS5I for all-solid-state batteries. J. Am. Chem. Soc. 140, 16330-16339 (2018).

[38]. W. J. Hyun, C. M. Thomas, M. C. Hersam, Nanocomposite ionogel electrolytes for solid-state rechargeable batteries. Adv. Energy Mater. 10, 2002135 (2020).

[39]. P. Zhang et al., Polymerized ionic networks with high charge density: quasi-solid electrolytes in lithium-metal batteries. Adv. Mater. 27, 8088-8094 (2015).

[40]. G. Zheng et al., Interconnected hollow carbon nanospheres for stable lithium metal anodes. Nat. Nanotechnol. 9, 618-623 (2014).

[41]. S. Choudhury, R. Mangal, A. Agrawal, L. A. Archer, A highly reversible room-temperature lithium metal battery based on crosslinked hairy nanoparticles. Nat. Commun. 6, 10101 (2015).

What is claimed is:

1. A heterostructure ionogel electrolyte, comprising:

a first electrolyte comprising a first ionic liquid and a matrix; and a second electrolyte comprising a second ionic liquid and the matrix, wherein the first ionic liquid is a high-potential ionic liquid having an anodic stability greater than 5 V vs $Li/Li^+$, the second ionic liquid is a low-potential ionic liquid having a cathodic stability less than 0 V vs $Li/Li^+$, and the matrix comprises hexagonal boron nitride (hBN) nanoplatelets/nanosheets;

wherein the first electrolyte and the second electrolyte are layered and assembled to define a solid-state heterointerface therebetween;

wherein the hBN nanoplatelets/nanosheets are configured to immobilize the first and second ionic liquids at the heterointerface, thereby minimizing intermixing between the first and second electrolytes and maintaining an extended electrochemical window that concurrently covers operating potentials of a high-voltage cathode and a low-voltage anode of a solid-state lithium-ion battery; and wherein the first electrolyte is configured to serve as a high-potential electrolyte on a side of the cathode of the solid-state lithium-ion battery, and the second electrolyte is configured to serve as a low-potential electrolyte on a side of the anode of the solid-state lithium-ion battery.

2. The heterostructure ionogel electrolyte of claim 1, wherein each of the low-potential and high-potential ionic liquids has low viscosity and high ionic conductivity.

3. The heterostructure ionogel electrolyte of claim 1, wherein the low-potential ionic liquid is configured such that anions enable cathodic stability, and the high-potential ionic liquid is configured to have oxidative stability of anions.

4. The heterostructure ionogel electrolyte of claim 1, wherein each of the first and second ionic liquids is prepared with ionic liquids including ammonium, imidazolium, pyrrolidinium, pyridinium, piperidinium, phosphonium, or sulfonium-based ionic liquids.

5. The heterostructure ionogel electrolyte of claim 1, wherein each of the first and second ionic liquids further comprises a lithium salt, a sodium salt, a potassium salt, a magnesium salt, a calcium salt, a zinc salt, or an aluminum salts.

6. The heterostructure ionogel electrolyte of claim 5, wherein the lithium salt comprises lithium bis(fluorosulfonyl)imide, lithium hexafluorophosphate, lithium tetrafluoroborate, lithium perchlorate, lithium trifluoromethanesulfonate, lithium fluoroalkylsufonimides, lithium fluoroarylsufonimides, lithium bis(oxalate borate), lithium tris(trifluoromethylsulfonylimide)methide, lithium tetrachloroaluminate, or lithium chloride.

7. The heterostructure ionogel electrolyte of claim 1, wherein the first ionic liquid comprises a 1-ethyl-3-methylimidazolium bis(trifluoromethylsulfonyl)imide (EMIM-TFSI) ionic liquid, and wherein the second ionic liquid comprises a 1-ethyl-3-methylimidazolium bis(fluorosulfonyl)imide (EMIM-FSI) ionic liquid.

8. The heterostructure ionogel electrolyte of claim 7, wherein each of the first and second ionic liquids further comprises lithium bis(trifluoromethylsulfonyl)imide (LiTFSI) salt.

9. The heterostructure ionogel electrolyte of claim 1, wherein the hBN nanoplatelets/nanosheets are liquid-phase exfoliated hBN nanoplatelets/nanosheets formed from bulk hBN microparticles by a liquid-phase exfoliation method.

10. The heterostructure ionogel electrolyte of claim 1, wherein a ratio between each of the first and second ionic liquids and the nanoplatelets/nanosheets is about 3:2 by weight.

11. An electrochemical device, comprising the heterostructure ionogel electrolyte of claim 1, the electrochemical device being the solid-state lithium-ion battery.

* * * * *